US012787136B2

(12) United States Patent
Nishimura et al.

(10) Patent No.: US 12,787,136 B2
(45) Date of Patent: Nov. 3, 2026

(54) LIGHT-EMITTING ELEMENT DRIVE CIRCUIT AND LASER PROCESSING MACHINE

(71) Applicant: Mitsubishi Electric Corporation, Tokyo (JP)

(72) Inventors: Kengo Nishimura, Tokyo (JP); Shuji Wakaiki, Tokyo (JP); Koji Nakajima, Tokyo (JP); Takashi Kumagai, Tokyo (JP); Yoshikazu Tsunoda, Tokyo (JP); Takeshi Morimoto, Tokyo (JP); Yuichi Igarashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 19/106,221

(22) PCT Filed: Sep. 13, 2023

(86) PCT No.: PCT/JP2023/033414
§ 371 (c)(1),
(2) Date: Feb. 25, 2025

(87) PCT Pub. No.: WO2024/070709
PCT Pub. Date: Apr. 4, 2024

(65) Prior Publication Data

US 2026/0075690 A1 Mar. 12, 2026

(30) Foreign Application Priority Data

Sep. 28, 2022 (JP) ................................ 2022-155285

(51) Int. Cl.
*H05B 45/395* (2020.01)

(52) U.S. Cl.
CPC ................................ *H05B 45/395* (2020.01)

(58) Field of Classification Search
None
See application file for complete search history.

(56) References Cited

U.S. PATENT DOCUMENTS 5,581,454 A * 12/1996 Collins .................. H02M 3/07 363/59
5,756,981 A * 5/1998 Roustaei ................ G03F 7/705 235/462.07

(Continued)

FOREIGN PATENT DOCUMENTS

JP 2005-332546 A 12/2005
JP 2011-513988 A 4/2011

(Continued)

OTHER PUBLICATIONS

International Search Report and Written Opinion mailed on Oct. 31, 2023, received for PCT Application No. PCT/JP2023/033414, filed on Sep. 13, 2023, 8 pages including English Translation.

*Primary Examiner* — Srinivas Sathiraju
(74) *Attorney, Agent, or Firm* — XSENSUS LLP

(57) ABSTRACT

A light-emitting element drive circuit includes a boost voltage source that applies a first voltage to an LD, a main voltage source that applies a second voltage lower than the first voltage to the LD, a MOSFET that switches on and off the application of the first voltage to the LD, and a linear regulator that controls current flowing through the LD. The linear regulator includes a MOSFET through which the current flowing through the LD flows, and a drive unit that drives the MOSFET. The drive unit includes a gate drive circuit that drives the MOSFET, two or more constant circuits having mutually different control constants set, and a switch mechanism that selects one of the two or more constant circuits and connects the selected one to the gate (Continued)

100A drive circuit, according to whether a voltage applied to the LD is the first voltage or the second voltage.

17 Claims, 22 Drawing Sheets

(56) References Cited

U.S. PATENT DOCUMENTS

| | | | | | |
|---|---|---|---|---|---|
| 6,195,605 | B1 * | 2/2001 | Tabler | B60Q 1/52 | 340/436 |
| 6,369,525 | B1 * | 4/2002 | Chang | H05B 45/385 | 315/300 |
| 6,801,028 | B2 * | 10/2004 | Kernahan | H05B 41/2828 | 323/283 |
| 6,801,146 | B2 * | 10/2004 | Kernahan | G11C 27/02 | 341/122 |
| 6,864,644 | B2 * | 3/2005 | Kernahan | H05B 41/3927 | 315/307 |
| 6,906,502 | B2 * | 6/2005 | Kernahan | H02M 1/0845 | 361/91.7 |
| 6,946,753 | B2 * | 9/2005 | Kernahan | G06F 1/24 | 307/151 |
| 8,754,371 | B2 * | 6/2014 | Hunter | H01J 49/30 | 250/281 |
| 9,312,117 | B2 * | 4/2016 | Hunter | H01J 49/147 | |
| 2002/0008499 | A1 * | 1/2002 | Henry | H02M 3/07 | 323/267 |
| 2002/0008567 | A1 * | 1/2002 | Henry | H02M 3/073 | 327/536 |
| 2002/0027467 | A1 * | 3/2002 | Henry | H02M 3/07 | 327/536 |
| 2003/0235062 | A1 * | 12/2003 | Burgyan | H05B 45/34 | 363/121 |
| 2004/0041620 | A1 * | 3/2004 | D'Angelo | H05B 45/375 | 327/534 |
| 2005/0007777 | A1 * | 1/2005 | Klipstein | F21L 4/005 | 362/244 |
| 2005/0187447 | A1 * | 8/2005 | Chew | A61B 5/14551 | 600/323 |
| 2005/0213353 | A1 * | 9/2005 | Lys | H02M 1/425 | 363/17 |
| 2009/0219964 | A1 * | 9/2009 | Yossi | H01S 5/042 | 372/38.02 |
| 2012/0205534 | A1 * | 8/2012 | Hunter | H01J 49/0013 | 250/281 |
| 2012/0245444 | A1 * | 9/2012 | Otis | A61B 5/1486 | 600/345 |
| 2012/0248986 | A1 * | 10/2012 | Gibbs | H05B 45/395 | 315/122 |
| 2012/0249013 | A1 * | 10/2012 | Valois | H05B 45/18 | 315/291 |
| 2012/0286681 | A1 * | 11/2012 | Hausman, Jr. | H05B 41/3924 | 315/307 |
| 2013/0009557 | A1 * | 1/2013 | Szczeszynski | H05B 31/50 | 315/186 |
| 2013/0021580 | A1 * | 1/2013 | Morgan | H05B 45/3725 | 315/192 |
| 2013/0043810 | A1 * | 2/2013 | McKinney | H05B 45/3725 | 315/307 |
| 2013/0082615 | A1 * | 4/2013 | Williams | H05B 45/52 | 315/186 |
| 2013/0088152 | A1 * | 4/2013 | Hagen | F21V 23/005 | 315/130 |
| 2013/0134891 | A1 * | 5/2013 | Woytowitz | H05B 47/196 | 315/201 |
| 2013/0134960 | A1 * | 5/2013 | Govier | G01R 31/60 | 324/66 |
| 2013/0154488 | A1 * | 6/2013 | Sadwick | H05B 45/14 | 315/172 |
| 2013/0170263 | A1 * | 7/2013 | Newman, Jr. | H05B 39/048 | 363/126 |
| 2013/0175931 | A1 * | 7/2013 | Sadwick | H05B 47/10 | 315/210 |
| 2013/0221875 | A1 * | 8/2013 | Liao | H05B 45/10 | 315/307 |
| 2014/0055061 | A1 * | 2/2014 | Chambers | E06B 9/68 | 315/209 R |
| 2014/0326866 | A1 * | 11/2014 | Hunter | H01J 49/022 | 250/288 |
| 2014/0361705 | A1 * | 12/2014 | Nederbragt | H05B 45/10 | 327/174 |
| 2015/0245441 | A1 * | 8/2015 | McCune, Jr. | H05B 45/10 | 315/185 R |
| 2016/0105936 | A1 * | 4/2016 | Melanson | H02M 3/24 | 315/246 |
| 2016/0127875 | A1 * | 5/2016 | Zampini, II | G01S 5/0226 | 370/311 |
| 2016/0172180 | A1 * | 6/2016 | Hunter | H01J 49/147 | 250/288 |
| 2017/0238392 | A1 * | 8/2017 | Shearer | H05B 45/10 | 315/153 |
| 2017/0316928 | A1 * | 11/2017 | Hunter | H01J 49/24 | |
| 2019/0356111 | A1 * | 11/2019 | Nishioka | H01S 5/042 | |
| 2026/0075690 | A1 * | 3/2026 | Nishimura | H05B 45/395 | |

FOREIGN PATENT DOCUMENTS

| | | |
|---|---|---|
| JP | 2019-204816 A | 11/2019 |
| JP | 2022-161687 A | 10/2022 |

* cited by examiner

LIGHT-EMITTING ELEMENT DRIVE CIRCUIT AND LASER PROCESSING MACHINE

CROSS-REFERENCE TO RELATED APPLICATIONS

This application is a national stage application, pursuant to 35 U.S.C. § 371, of International Patent Application No. PCT/JP2023/033414, filed Sep. 13, 2023, which claims priority to Japanese Patent Application No. 2022-155285, filed Sep. 28, 2022, the entire contents of each are incorporated herein by reference.

FIELD

The present disclosure relates to a light-emitting element drive circuit that drives a light-emitting element such as a laser diode (LD) or a light-emitting diode (LED).

BACKGROUND

An LD or an LED, which is a light-emitting element emitting light with intensity corresponding to current flowing therethrough, is driven by direct current. A drive circuit that drives the light-emitting element is commonly configured such that the light-emitting element, a constant-voltage source, and a linear regulator are arranged in series and the linear regulator controls current through the light-emitting element. To reduce losses in the drive circuit, the voltage of the constant-voltage source is set to a value slightly higher than the forward voltage of the light-emitting element. The thus configured drive circuit suffers from no particular problem when the light-emitting element is constantly turned on. When the light-emitting element is controlled such that the light-emitting element is turned from an OFF state to an ON state, on the other hand, it is necessary to carry current through wiring inductance with a potential gradient, i.e., the slight potential difference between the constant-voltage source and the forward voltage of the light-emitting element. This results in a problem of an extremely slow current rise.

To solve the above problem, Patent Literature 1 described below discloses a drive circuit configured to include two power supplies, a high-voltage source with a relatively high voltage and a low-voltage source with a relatively low voltage. In Patent Literature 1, at the time current rises immediately after an LD is turned on, the high-voltage source is controlled such that the high-voltage source is turned on to apply the high voltage to the drive circuit so as to increase the rate of rise of the current. After the current of the LD rises, the high-voltage source is controlled such that the high-voltage source is turned off so as to allow the low-voltage source alone to carry a constant current through the LD.

CITATION LIST

Patent Literature

Patent Literature 1: Japanese Translation of PCT International Application Laid-open No. 2011-513988

SUMMARY OF INVENTION

Problem to be Solved by the Invention

Under the control disclosed in Patent Literature 1, unfortunately, the speed of current flowing through the LD changes greatly at the time of switching from the high-voltage source to the low-voltage source, so that the control becomes unstable causing a problem of a possible oscillation of the current flowing through the LD. The oscillation can be suppressed by reducing the current rise rate immediately after the LD is turned on, in which case it is impossible to increase the rise rate.

The present disclosure has been made in view of the above, and an object thereof is to provide a light-emitting element drive circuit that can achieve both a higher current rise rate immediately after an LD is turned on and control stability.

Means to Solve the Problem

To solve the above-described problem and achieve the object, a light-emitting element drive circuit according to the present disclosure is a light-emitting element drive circuit to drive a light-emitting element, and includes first and second DC power supplies, a first switch element, a backflow prevention element, and a linear regulator to control current flowing through the light-emitting element. The first DC power supply holds a first voltage and is connected to the anode of the light-emitting element so as to be able to apply the first voltage to the anode of the light-emitting element. The second DC power supply is connected to the anode of the light-emitting element so as to be able to apply a second voltage lower than the first voltage to the anode of the light-emitting element. The first switch element switches on and off the application of the first voltage to the anode of the light-emitting element. The backflow prevention element is connected in an orientation that prevents the first voltage from being applied to the second DC power supply. The linear regulator includes a current detector to detect the current flowing through the light-emitting element, a second switch element through which the current flowing through the light-emitting element flows, and a drive unit to drive the second switch element. The drive unit includes a gate drive circuit to drive the gate of the second switch element, two or more constant circuits having mutually different control constants set, and a switch mechanism to select one of the two or more constant circuits and connect the selected one to the gate drive circuit, according to whether a voltage applied to the light-emitting element is the first voltage or the second voltage.

Effects of the Invention

The light-emitting element drive circuit according to the present disclosure has an advantage of achieving both the higher current rise rate immediately after an LD is turned on and the control stability.

DESCRIPTION OF EMBODIMENTS

A light-emitting element drive circuit according to embodiments of the present disclosure will be hereinafter described in detail with reference to the accompanying drawings. The following embodiments describe an LD drive circuit that drives an LD by way of example, but are not intended to exclude light-emitting elements other than LDs. In the following description, physical connection and electrical connection are simply referred to as "connection" without distinction. That is, the term "connection" includes both direct connection between components and indirect connection between components through another component.

First Embodiment

Figure 1:
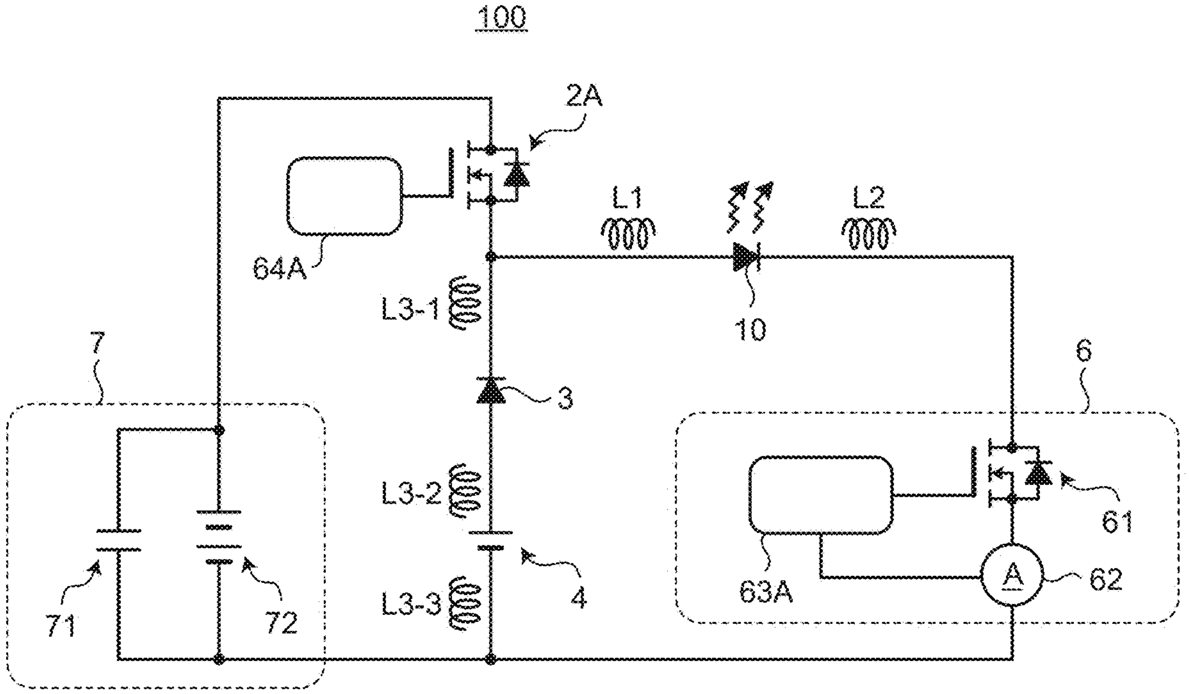
FIG. 1 is a circuit diagram illustrating a configuration of a light-emitting element drive circuit 100 according to a first embodiment.

FIG. 1 is a circuit diagram illustrating a configuration of a light-emitting element drive circuit 100 according to a first embodiment. The light-emitting element drive circuit 100 includes an LD 10, a metal-oxide-semiconductor field-effect transistor (MOSFET) 2A, a drive unit 64A for driving the MOSFET 2A, a diode 3, a boost voltage source 7, a main voltage source 4, and a linear regulator 6. The diode 3 is a backflow prevention element. The boost voltage source 7 is defined as a first DC power supply, and the main voltage source 4 is defined as a second DC power supply. The linear regulator 6 includes a MOSFET 61, a current detector 62 as a first current detector, and a drive unit 63A for driving the MOSFET 61. The MOSFET 61, the current detector 62, and the drive unit 63A define components for controlling current flowing through the LD 10. The boost voltage source 7 includes a capacitor 71 as a charge storage element and a voltage source 72. The capacitor 71, which is a charge storage element, is connected across the voltage source 72. In this description, the MOSFET 2A is sometimes referred to as a "first switch element", and the MOSFET 61 as a "second switch element".

The LD 10 is an example of a light-emitting element. The anode of the LD 10 is connected to a connection point between the source of the MOSFET 2A and the cathode of the diode 3. The cathode of the LD 10 is connected to the drain of the MOSFET 61. In FIG. 1, the LD 10 is illustrated as a single element, but is not limited to a single element. The LD 10 may be made up of a plurality of elements connected in series or in series parallel.

The anode of the diode 3 is connected to the positive terminal of the main voltage source 4. The drain of the MOSFET 2A is connected to the positive terminal of the boost voltage source 7. The source of the MOSFET 61 is connected to the negative terminal of the main voltage source 4 through the current detector 62, and the connection point therebetween is connected to the negative terminal of the boost voltage source 7.

FIG. 1 illustrates two voltage sources, the main voltage source 4 and the boost voltage source 7, but each voltage source is not limited to a single one. That is, two or more main voltage sources 4 may be used, and two or more boost voltage sources 7 may be used. The increased number of voltage sources of at least one type, the main voltage source 4 or the boost voltage source 7, enables output according to the load condition and thus more stable control.

Wiring inductances L1 and L2 are illustrated on both sides of the LD 10. The wiring inductance L1 is the inductance of electrical wiring between the anode of the LD 10 and the connection point between the cathode of the diode 3 and the source of the MOSFET 2A. The wiring inductance L2 is the inductance of electrical wiring between the negative terminal of the main voltage source 4 and the cathode of the LD 10. Wiring inductances L3-1, L3-2, and L3-3 are illustrated at both ends of the diode 3 and the main voltage source 4.

The wiring inductance L3-1 is the inductance of electrical wiring between the cathode of the diode 3 and the connection point between the source of the MOSFET 2A and the anode of the LD 10. The wiring inductance L3-2 is the inductance of electrical wiring between the anode of the diode 3 and the positive terminal of the main voltage source 4. The wiring inductance L3-3 is the inductance of electrical wiring between the negative terminal of the main voltage source 4 and the connection point between the negative terminal of the boost voltage source 7 and the linear regulator 6.

Next, features of the circuit configuration of the light-emitting element drive circuit 100 according to the first embodiment connected as described above will be described. The boost voltage source 7 holds a first voltage and is connected to the anode of the LD 10 through the MOSFET 2A so as to be able to apply the first voltage to the anode of the LD 10. The main voltage source 4 holds a second voltage lower than the first voltage, and is connected to the anode of the LD 10 so as to be able to apply the second voltage to the anode of the LD 10. The diode 3 is connected in an orientation that prevents the first voltage from being applied to the main voltage source 4. The MOSFET 2A switches on and off the application of the first voltage to the anode of the LD 10. The linear regulator 6 controls current flowing through the LD 10. The current flowing through the LD 10 flows through the MOSFET 61. The current detector 62 detects the current flowing through the MOSFET 61 to thereby detect the current flowing through the LD 10. The drive unit 63A drives the MOSFET 61, on the basis of a detection value of the current detector 62.

Figure 2:
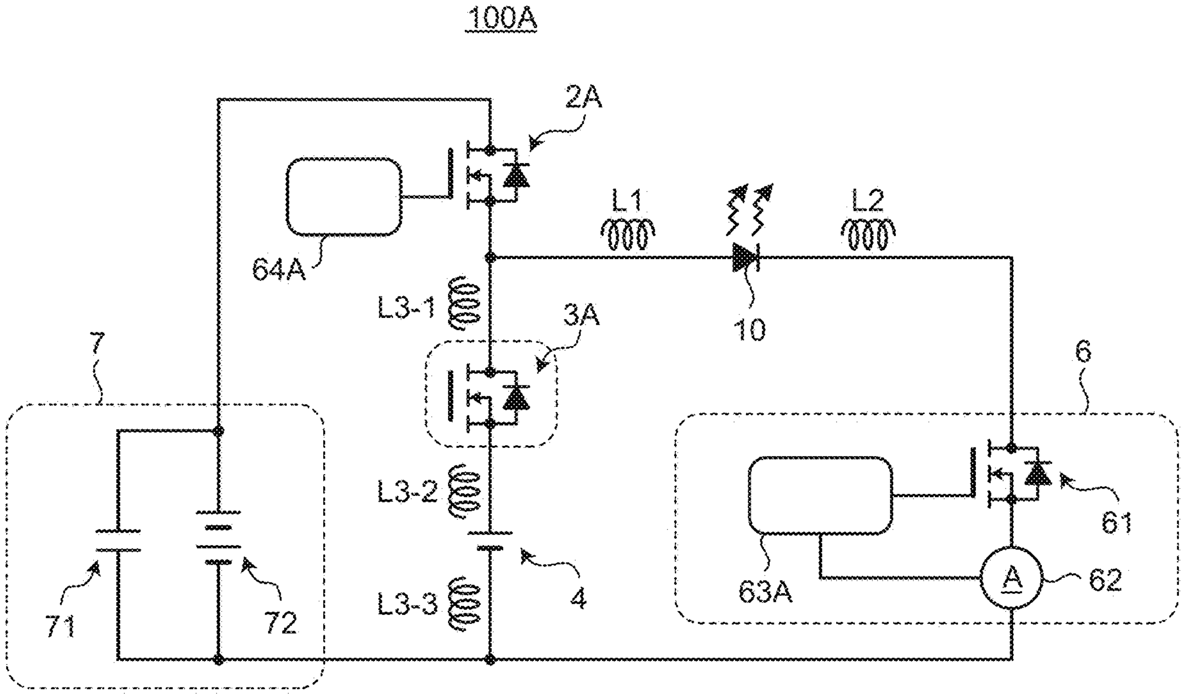
FIG. 2 is a circuit diagram illustrating a configuration of a light-emitting element drive circuit 100A according to a modification of the first embodiment.

FIG. 2 is a circuit diagram illustrating a configuration of a light-emitting element drive circuit 100A according to a modification of the first embodiment. FIG. 2 illustrates a MOSFET 3A in place of the diode 3 illustrated in FIG. 1. The other configuration is the same as or equivalent to the configuration of FIG. 1. The same or equivalent components are denoted by the same reference numerals, and redundant descriptions thereof are omitted.

The MOSFET 3A is an example of a switch element including an anti-parallel connected diode. Anti-parallel means that the anode of the diode is connected to the source of the MOSFET 3A, and the cathode of the diode is connected to the drain of the MOSFET 3A. The orientation of the anti-parallel connected diode is the same as the orientation of the diode 3 and operates as a backflow prevention element. The anti-parallel connected diode may be an externally connected diode or a parasitic diode included in the MOSFET 3A. The parasitic diode is also referred to as a body diode. Using the parasitic diode eliminates the need for a separate diode, thus allowing a reduction in the number of components, which leads to cost reduction.

The MOSFET 3A may be turned on under synchronous rectification control at the time current flows through the anti-parallel connected diode. The synchronous rectification control on the MOSFET 3A further reduces circuit loss and thus improves power supply efficiency.

Figure 3:
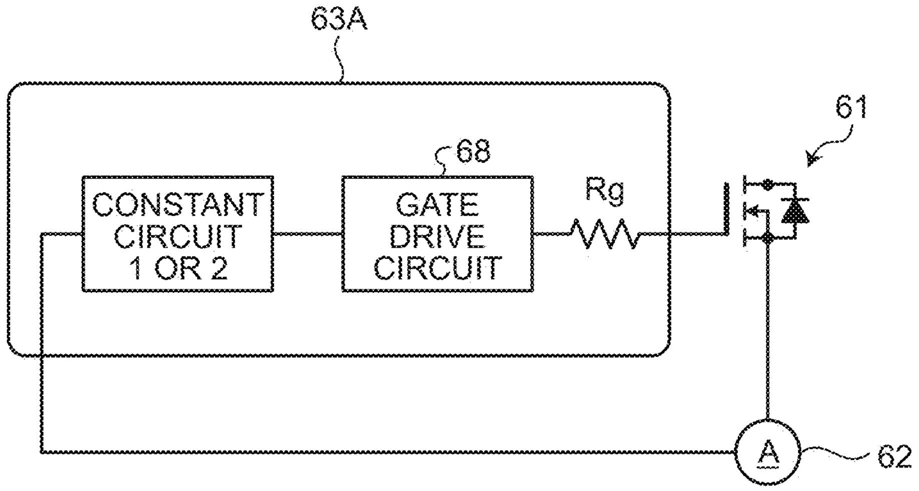
FIG. 3 is a circuit diagram illustrating a typical exemplary configuration of a drive unit 63A illustrated in FIG. 1.

FIG. 3 is a circuit diagram illustrating a typical exemplary configuration of the drive unit 63A illustrated in FIG. 1. FIG. 3 illustrates the MOSFET 61 and the current detector 62 together with the drive unit 63A.

The phrase "constant circuit 1 or 2" means that either a "constant circuit 1" or a "constant circuit 2" is disposed. The hitherto used drive unit 63A commonly includes a single constant circuit alone, as illustrated in FIG. 3.

The single constant circuit is connected to a gate drive circuit 68. The gate drive circuit 68, which is a circuit to drive the gate of the MOSFET 61, is connected to the MOSFET 61 through a gate resistor Rg. The constant circuit, which is, for example, an error amplifier or an error amplifier circuit, is a circuit to compare a reference voltage with a feedback voltage derived from the current flowing through the MOSFET 61 and control the gate voltage of the MOSFET 61 such that the gate voltage becomes a desired voltage. In this description, a control constant set by the constant circuit 1 is referred to as a "control constant 1", and a control constant set by the constant circuit 2 is referred to as a "control constant 2".

As described in the section "Problem to be solved by the Invention", the speed of LD current, which is current flowing through the LD, changes greatly at the time of switching from the high-voltage source to the low-voltage source, so that the control becomes unstable, and the LD current can oscillate. For example, when the control constant is set with the first voltage (high voltage) for increasing the rate of rise of the LD current, the control becomes unstable and oscillation is likely to occur at the second voltage (low voltage) to which the voltage is switched for reducing losses after the rise. Conversely, when the control constant is set with the second voltage, the control at the time of rise becomes unstable, and an overshoot or oscillation is likely to occur. This phenomenon is caused by control characteristics that require responsiveness of the order of 100 us or less under the control of the first voltage, but allows responsiveness of the order of 100 ms or less under the control of the second voltage. That is, the large difference in control responsiveness before and after the switching of the applied voltage is the cause of that phenomenon.

Figure 4:
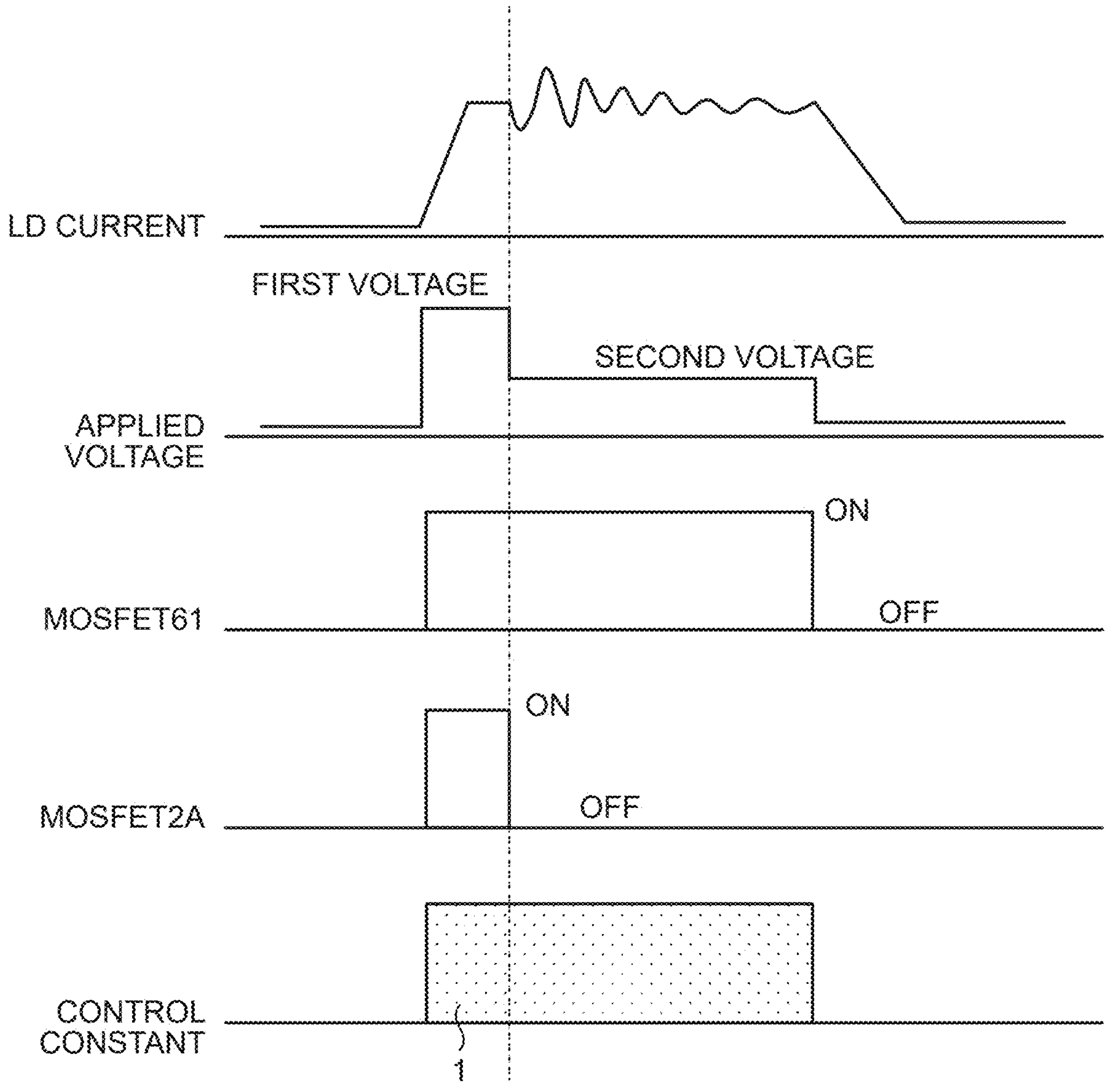
FIG. 4 is a first time chart for explaining operation in the case where control is performed using the drive unit 63A of FIG. 3.
Figure 5:
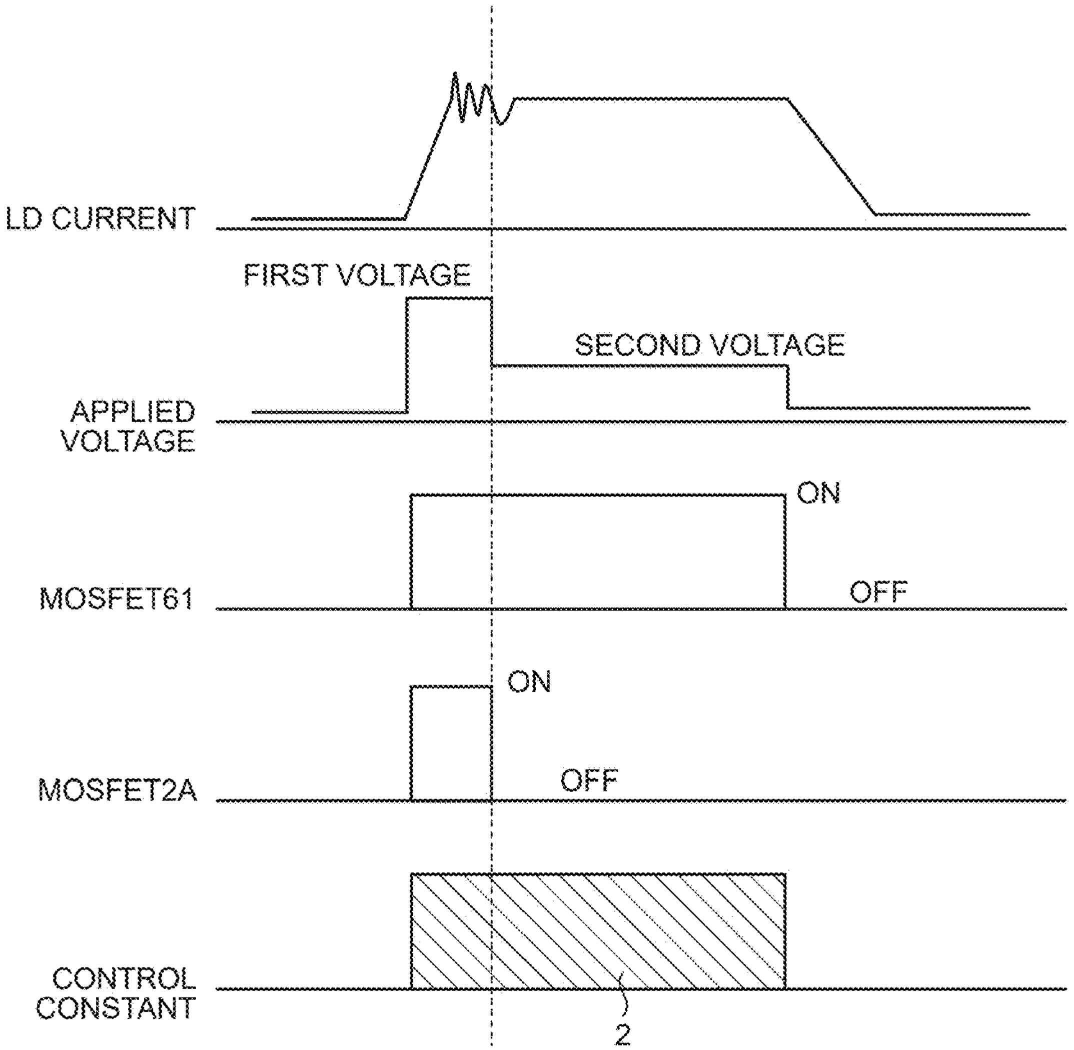
FIG. 5 is a second time chart for explaining operation in the case where control is performed using the drive unit 63A of FIG. 3.

FIG. 4 is a first time chart for explaining operation in the case where control is performed using the drive unit 63A of FIG. 3. FIG. 5 is a second time chart for explaining operation in the case where control is performed using the drive unit 63A of FIG. 3.

Specifically, FIG. 4 is a time chart where the constant circuit 1 having the control constant 1 set in accordance with the first voltage is also used at the time of application of the second voltage. In contrast, FIG. 5 is a time chart where the constant circuit 2 having the control constant 2 set in accordance with the second voltage is also used at the time of application of the first voltage. In both FIGS. 4 and 5, waveforms represent, from the upper side, LD current, applied voltage, the operating state of the MOSFET 61, the operating state of the MOSFET 2A, and the set control constant. The LD current is current flowing through the LD 10. The applied voltage is a voltage between the anode of the LD 10 and the negative terminal of the main voltage source 4. The MOSFET operating states indicate the operating states of the MOSFETs representing gate-source voltages to the MOSFETs. The horizontal axes in both drawings represent time. The difference in the control constant is represented by differences in the numerical value and hatch pattern. Specifically, "1" means the control constant 1, and "2" means the control constant 2. Note not the drive unit 63A but the drive unit 64A controls the MOSFET 2A such that the MOSFET 2A is turned on and off. For the purpose of telling drive units 63A and 64A from each other without the reference numerals, the drive unit 64A is sometimes referred to as a "second drive unit 64A" or a "second drive unit" having the reference numeral omitted.

FIG. 4 shows that the LD current oscillates when the second voltage is applied. This is because the control constant 1 set in accordance with the first voltage is also used when the second voltage is applied. FIG. 5 shows that the LD current oscillates when the first voltage is applied. This is because the control constant 2 set in accordance with the second voltage is also used when the first voltage is applied.

The oscillation of the LD current causes unevenness in the light-emission intensity of the LD 10 and also affects the life of the LD 10. When a product to which the LD is applied is, for example, a laser processing machine or the like, the processing quality is affected. a possible way to solve these problems is, for example, to prepare two linear regulators 6 each suitable for the corresponding one of the first voltage and the second voltage. However, this possible way also requires two MOSFETs 61, two current detectors 62, and two drive units 63A. As a result, the circuit area and the number of components increase, resulting in unavoidable increases in the size and cost of the product. Further, there is a challenge of mutual resonance that can occur between the two linear regulators 6, resulting in a problem of increased design man-hours required for an anti-resonance measure.

Figure 6:
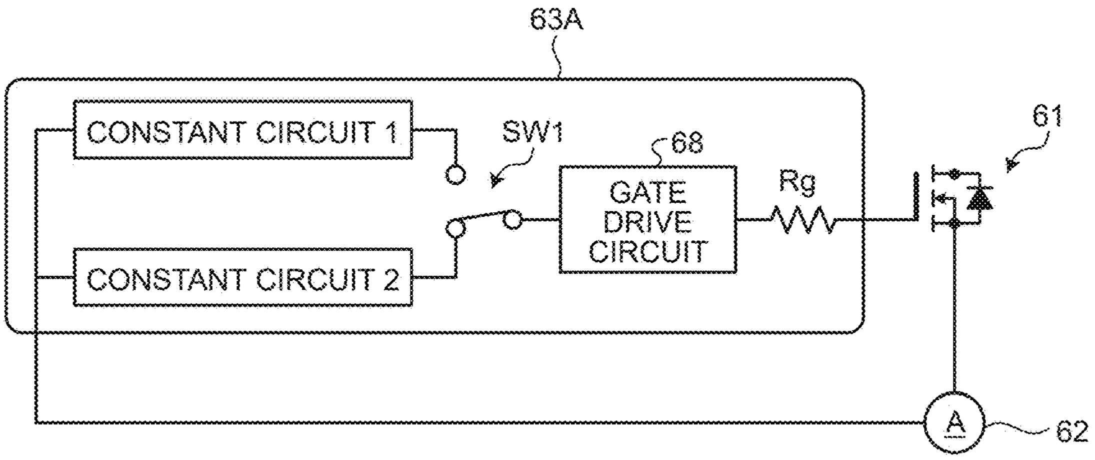
FIG. 6 is a circuit diagram illustrating a configuration of the drive unit 63A according to the first embodiment.

In view of this, the first embodiment presents a configuration illustrated in FIG. 6. FIG. 6 is a circuit diagram illustrating a configuration of the drive unit 63A according to the first embodiment. The same or equivalent components as those in FIG. 3 are denoted by the same reference numerals. As illustrated in FIG. 6, the drive unit 63A includes the constant circuit 1 and the constant circuit 2, and a switch mechanism SW1 as well. The constant circuit 1 corresponds to the first voltage and the constant circuit 2 corresponds to the second voltage. The switch mechanism SW1 selects one of the constant circuit 1 and the constant circuit 2 and connects the selected one to the gate drive circuit 68. The switch mechanism SW1 is switched to either the side of the constant circuit 1 or the side of the constant circuit 2, depending upon whether the voltage applied to the LD 10 is the first voltage or the second voltage.

Figure 7:
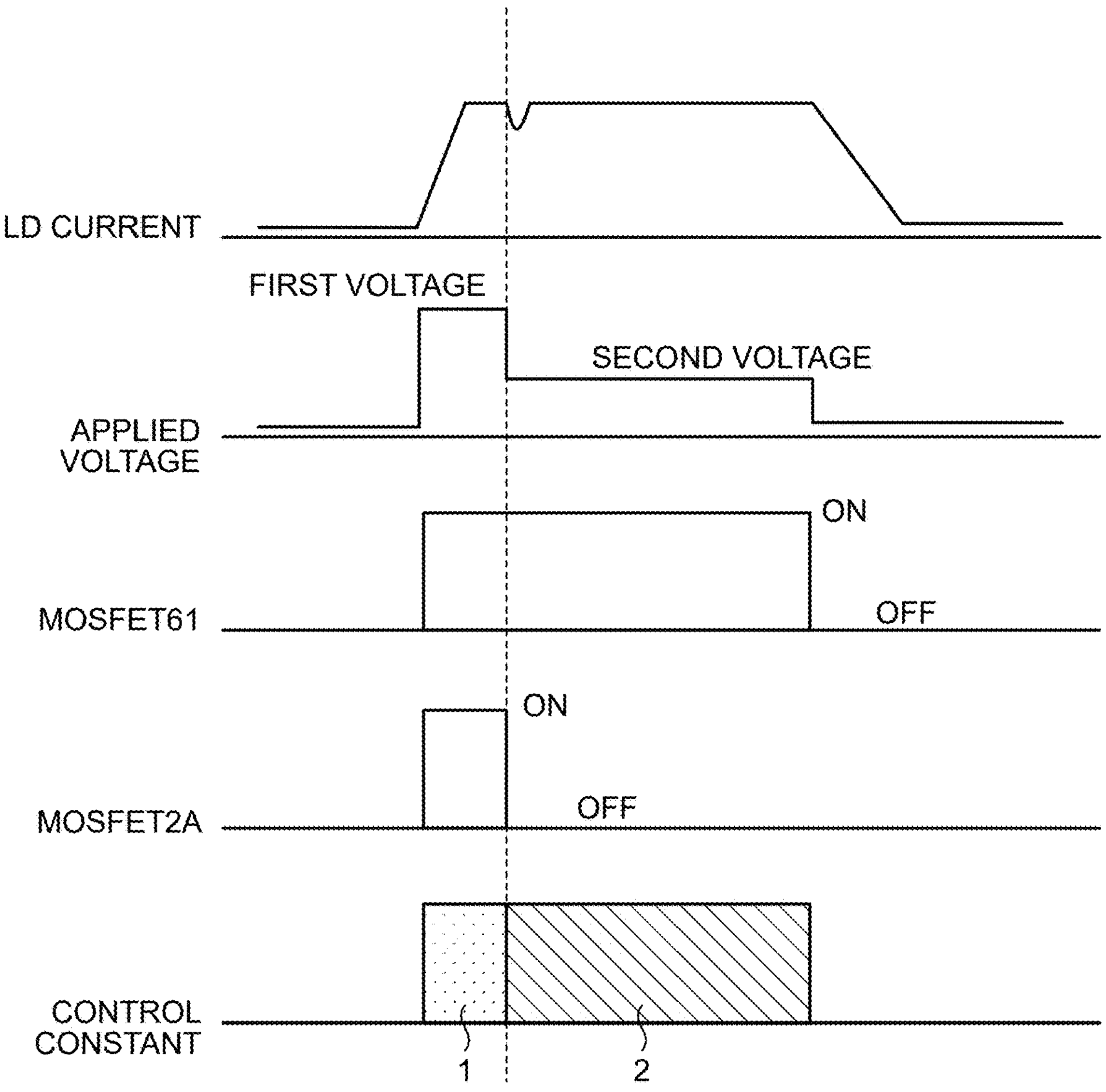
FIG. 7 is a time chart for explaining operation in the case where control is performed using the drive unit 63A of FIG. 6.

FIG. 7 is a time chart for explaining operation in the case where control is performed using the drive unit 63A of FIG. 6. The types of and how to represent waveforms are the same as those in FIGS. 4 and 5. FIG. 7 shows that although a phenomenon in which the LD current drops immediately after the application of the second voltage is observed, the LD current flows stably both at the time of application of the first voltage and at the time of application of the second voltage.

As described above, the light-emitting element drive circuit according to the first embodiment includes the first and second DC power supplies, the first switch element, the backflow prevention element, and the linear regulator that controls current flowing through the light-emitting element. The first DC power supply holds the first voltage and is connected to the anode of the light-emitting element so as to be able to apply the first voltage to the anode of the light-emitting element. The second DC power supply is connected to the anode of the light-emitting element so as to be able to apply the second voltage lower than the first voltage to the anode of the light-emitting element. The first switch element switches on and off the application of the first voltage to the anode of the light-emitting element. The backflow prevention element is connected in the orientation that prevents the first voltage from being applied to the second DC power supply. The linear regulator includes the current detector that detects current flowing through the light-emitting element, the second switch element through which the current flowing through the light-emitting element flows, and the drive unit that drives the second switch element. The drive unit includes the gate drive circuit that drives the gate of the second switch element, the two constant circuits having the mutually different control constants set, and the switch mechanism that selects one of the two constant circuits and connects the selected one to the gate drive circuit, depending upon whether the voltage applied to the light-emitting element is the first voltage or the second voltage. In the light-emitting element drive circuit configured like this, for example, when the voltage applied to the light-emitting element is the first voltage, the switch mechanism operates to select one of the two constant circuits, and when the voltage applied to the light-emitting element is the second voltage, the switch mechanism operates to switch the selection of the constant circuit so as to select the other of the two constant circuits. Thus, the light-emitting element drive circuit, which allows the selection of the constant circuit suitable for the applied voltage, can carry stable LD current at both the first voltage and the second voltage, and thus achieve both a higher rate of rise of LD current immediately after turning on the LD and control stability.

Further, the light-emitting element drive circuit according to the first embodiment can make do with the single linear regulator without additional linear regulators, and thus prevent increases in the circuit area and the number of components to thereby avoid increases in product size and manufacturing cost. Furthermore, because of the single linear regulator, it is not necessary to take measures against mutual resonance that can occur between two linear regulators. It is therefore expected that development man-hours can reduced as well. Consequently, it becomes possible to improve the performance of the product as well as to prevent increases in design cost and manufacturing cost and an increase in the size of the product.

In the first embodiment, the number of constant circuits is two, but may be three or more. In the case where at least one of the first and second DC power supplies includes two or more voltage sources, the number of constant circuits may be three or more in accordance with this power supply configuration.

Second Embodiment

As described above, the operation waveforms illustrated in FIG. 7 show the phenomenon in which the LD current drops immediately after the application of the second voltage. It is thought that the drop in the LD current is caused by the presence of the wiring inductances L3-1, L3-2, and L3-3 illustrated in FIG. 1. Not limited to the wiring inductances L3-1, L3-2, and L3-3, inductances have the property of suppressing a rapid current rise. Even when energization of the LD 10 starts with the first voltage applied, no LD current flows through the wiring inductances L3-1, L3-2, and L3-3. Immediately after switching from the first voltage to the second voltage, a counter electromotive force generated in the wiring inductances L3-1, L3-2, and L3-3 prevents the LD current from immediately following the switching, which in turn causes the drop as illustrated in the drawing. The second embodiment presents a solution to this problem.

Figure 8:
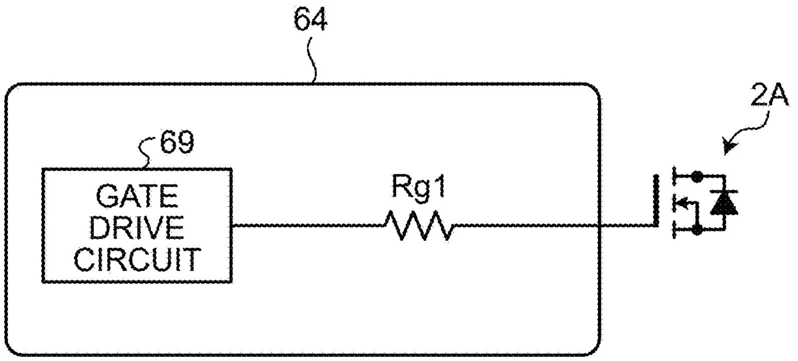
FIG. 8 is a diagram illustrating a circuit configuration of a second drive unit 64 that is a typical exemplary configuration of a second drive unit 64A illustrated in FIG. 1.

FIG. 8 is a diagram illustrating a circuit configuration of a second drive unit 64 that is a typical exemplary configuration of the second drive unit 64A illustrated in FIG. 1. FIG. 8 illustrates the MOSFET 2A together with the second drive unit 64. The second drive unit 64 includes a gate drive circuit 69 and a gate resistor Rg1. The gate drive circuit 69, which is a circuit to drive the gate of the MOSFET 2A, is connected to the MOSFET 2A through the gate resistor Rg1.

Figure 9:
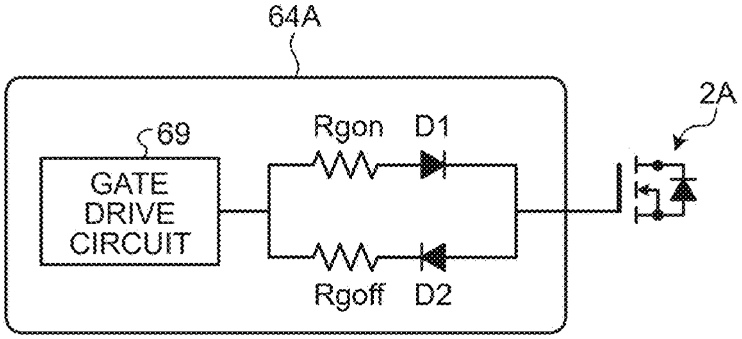
FIG. 9 is a circuit diagram illustrating a configuration of the second drive unit 64A according to a second embodiment.

FIG. 9 is a circuit diagram illustrating a configuration of the second drive unit 64A according to the second embodiment. The same or equivalent components as those in FIG. 8 are denoted by the same reference numerals. As illustrated in FIG. 9, the second drive unit 64A includes the gate drive circuit 69, gate resistors Rgon and Rgoff, and diodes D1 and D2. As the diodes D1 and D2, those having the same or equivalent characteristics are used.

The gate drive circuit 69 turns on the MOSFET 2A by injecting charge into the gate capacitance of the MOSFET 2A through the gate resistor Rgon and the diode D1. The gate drive circuit 69 turns off the MOSFET 2A by extracting charge stored in the gate capacitance of the MOSFET 2A through the gate resistor Rgoff and the diode D2. There is the relationship (resistance value of Rgon)< (resistance value of Rgoff) between the gate resistors Rgon and Rgoff. Using such a second drive unit 64A makes the drive speed when the MOSFET 2A is placed in a gate-on state faster than when the MOSFET 2A is placed in a gate-off state. In other words, the drive speed when the MOSFET 2A is placed in the gate-off state becomes slower than when the MOSFET 2A is placed in the gate-on state.

Figure 10:
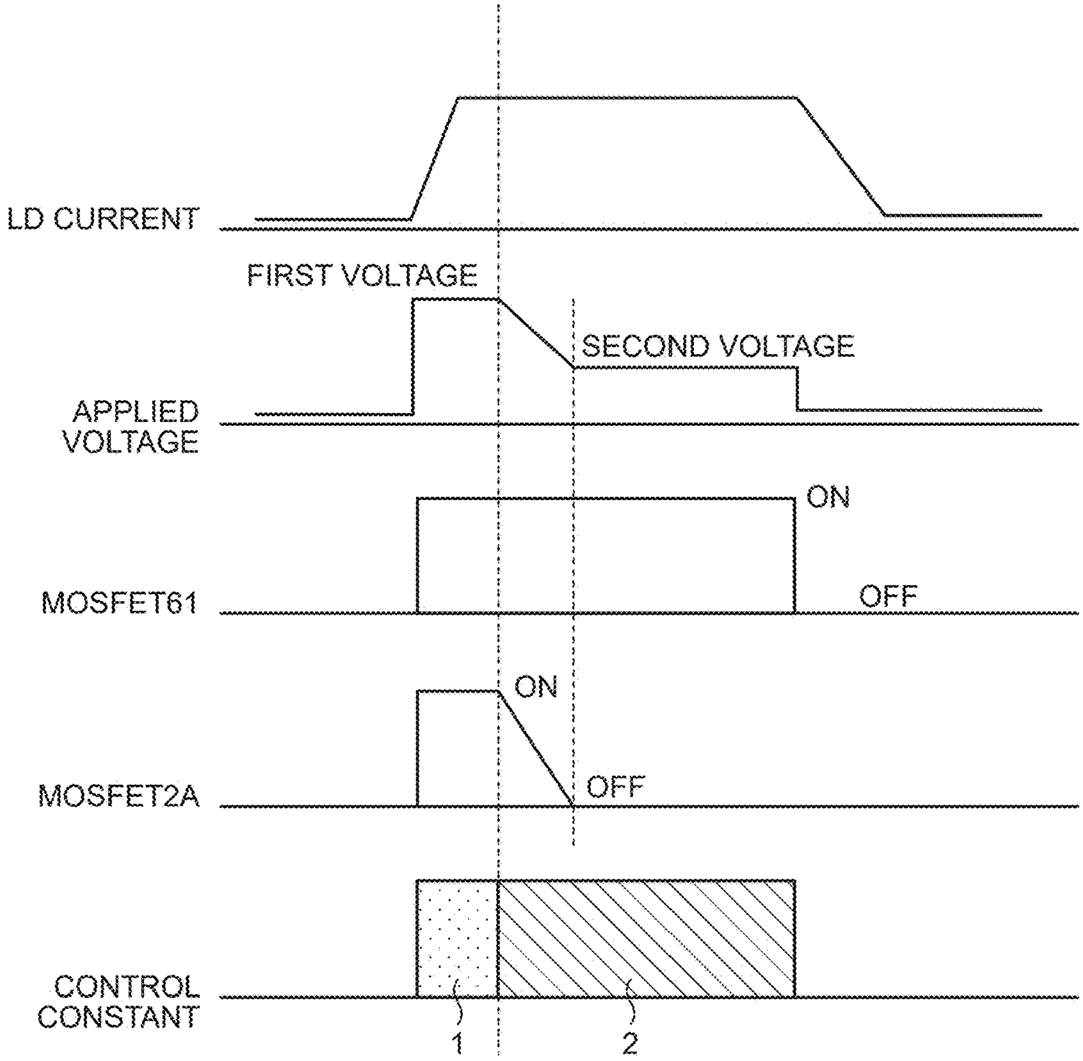
FIG. 10 is a time chart for explaining operation in the case where control is performed using the second drive unit 64A of FIG. 9.

FIG. 10 is a time chart for explaining operation in the case where control is performed using the second drive unit 64A of FIG. 9. The types of and how to represent waveforms are the same as those in the other time chart diagrams. Comparing the waveform of the applied voltage in FIG. 10 with that in FIG. 7, the fall of the applied voltage is slower in the case of FIG. 10. This is because the drive speed when the MOSFET 2A is placed in the gate-off state is slower than when the MOSFET 2A is placed in the gate-on state, as can be seen from comparison between a rising portion and a falling portion of the operation waveform of the MOSFET 2A in FIG. 10. As a result, the supply of current from the boost voltage source 7 is slowly cut off, so that the main voltage source 4 supplies current to the LD 10 in time. Consequently, as can be seen from comparison between the waveform of the LD current in FIG. 10 with that in FIG. 7, the drop in the LD current can be eliminated or reduced.

The function provided by the second drive unit 64A described above is referred to as a "voltage change mitigation means" in this description. The voltage change mitigation means is a means to implement a function of mitigating the change in the voltage applied to the LD 10 when the voltage applied to the LD 10 is switched from the first voltage (high voltage) to the second voltage (low voltage). FIG. 10 has been described taking a first example in which the voltage change mitigation means is provided inside the second drive unit 64A.

Note that when the second drive unit 64A is used, a preferred example is to use a MOSFET with a planar structure as the MOSFET 2A. The following describes the reason.

The turn-on speed and turn-off speed of a MOSFET depend on the voltage amplification degree, the gate capacitance, and the gate resistance of the MOSFET. The voltage amplification degree and the gate capacitance depend on the structure of the MOSFET. Specifically, for the voltage amplification degree typically, there is the relationship (voltage amplification degree of trench structure)>(voltage amplification degree of planar structure). For the gate capacitance typically, there is the relationship (gate capacitance of trench structure)<(gate capacitance of planar structure).

That is, comparing a MOSFET with a trench structure with a MOSFET with a planar structure reveals that the MOSFET with the trench structure has a relatively greater structure-derived voltage amplification degree and a smaller gate capacitance. For the MOSFET with the trench structure, thus, the gate resistance has a small effect on the time of charging and discharging of the gate capacitance, and the voltage amplification degree is great, so that the change width of the gate applied voltage in turning the MOSFET on can be small. The small change width means a low sensitivity of adjustment of the turn-on speed and the turn-off speed.

In contrast, in the MOSFET with the planar structure, the structure-derived voltage amplification degree is relatively smaller, and the gate capacitance is greater. For the MOSFET with the planar structure, thus, the gate resistance has a great effect on the time of charging and discharging of the gate capacitance, and the voltage amplification degree is small, so that the change width of the gate applied voltage in turning the MOSFET on needs to be increased. This means that the sensitivity of adjustment of the turn-on speed and the turn-off speed is high, and speed adjustment is easier than that in the trench structure. Thus, using a MOSFET with a planar structure as the MOSFET 2A makes it possible to easily obtain the effect of the voltage change mitigation means.

Next, another example of the voltage change mitigation means will be described with reference to FIGS. 11 and 12. First, FIG. 11 is a circuit diagram illustrating a configuration of a light-emitting element drive circuit 100B according to the second embodiment.

Figure 11:
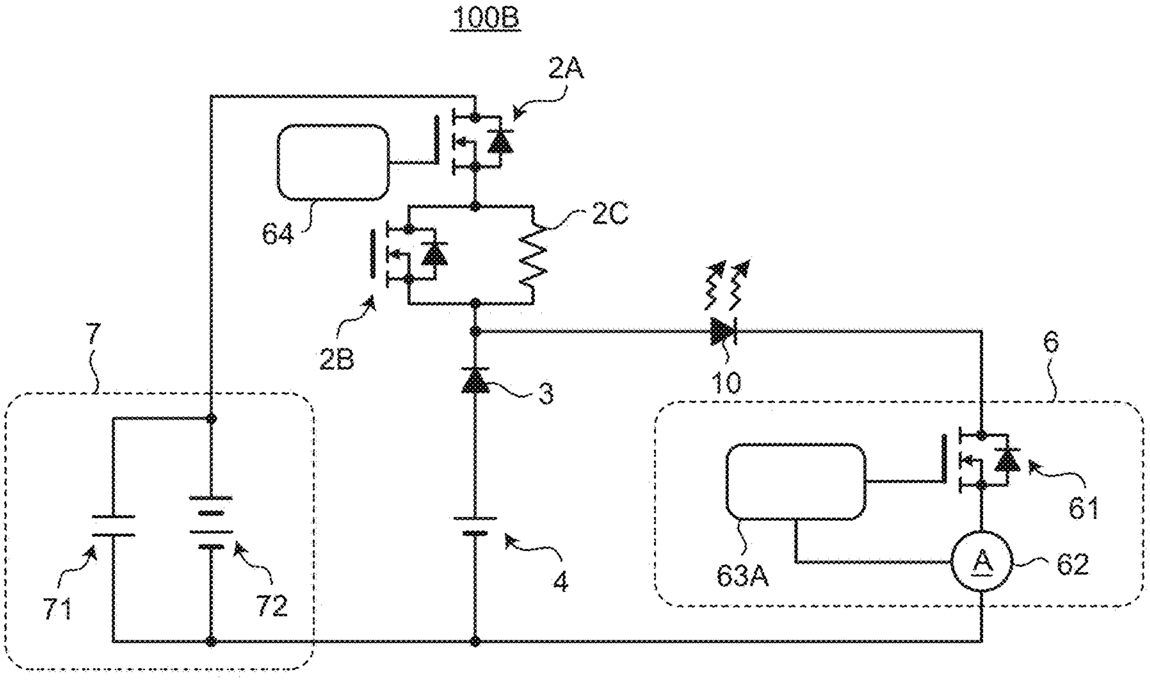
FIG. 11 is a circuit diagram illustrating a configuration of a light-emitting element drive circuit 100B according to the second embodiment.

Comparing the light-emitting element drive circuit 100B according to the second embodiment illustrated in FIG. 11 with the light-emitting element drive circuit 100 according to the first embodiment illustrated in FIG. 1 reveals that a parallel circuit made up of a MOSFET 2B and a resistor 2C is added in FIG. 11. The parallel circuit operates as the voltage change mitigation means in the light-emitting element drive circuit 100B. In FIG. 11, the drive unit 64A is changed to the drive unit 64. Note that the drive unit 64 may be the drive unit 64A. The other configuration is the same as or equivalent to the configuration of FIG. 1. The same or equivalent components are denoted by the same reference numerals, and redundant descriptions thereof are omitted. In this description, the MOSFET 2B is sometimes referred to as a "third switch element".

Although FIG. 11 illustrates an example in which the parallel circuit is disposed between the source of the MOSFET 2A and a connection point between the LD 10 and the diode 3, the present invention is not limited thereto. The parallel circuit may be disposed between the positive terminal of the boost voltage source 7 and the MOSFET 2A.

Figure 12:
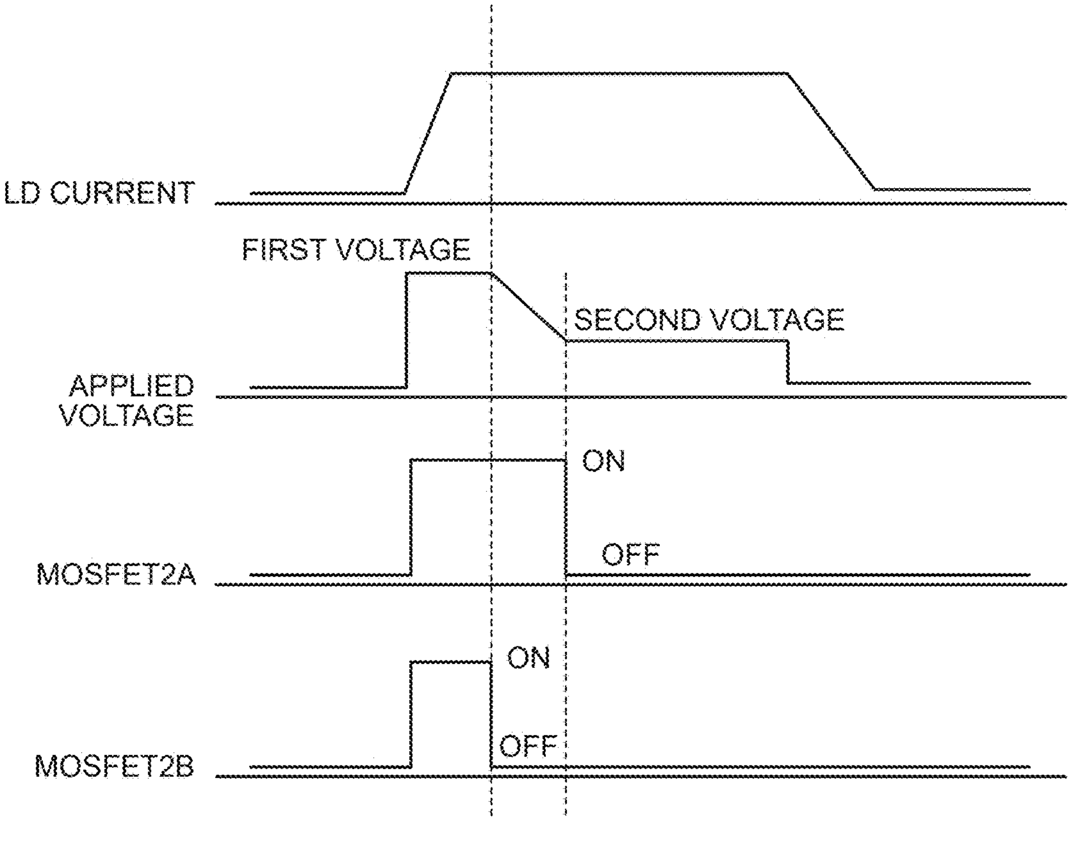
FIG. 12 is a time chart for explaining the operation of the light-emitting element drive circuit 100B according to the second embodiment.

FIG. 12 is a time chart for explaining the operation of the light-emitting element drive circuit 100B according to the second embodiment. In FIG. 12, waveforms represent, from the upper side, the LD current, the applied voltage, the operating state of the MOSFET 2A, and the operating state of the MOSFET 2B, and the horizontal axis represents time.

As illustrated in FIG. 12, the MOSFETs 2A and 2B are controlled such that the MOSFETs 2A and 2B are simultaneously turned on. As a result, the first voltage is applied to the anode of the LD 10 through the MOSFETs 2A and 2B. Thereafter, only the MOSFET 2B is controlled such that the MOSFET 2B is turned off. At this time, the MOSFET 2A continues to be on, such that the first voltage also continues to be applied to the LD 10 through the resistor 2C, thereby slowly supplying the LD current. Thereafter, as illustrated in FIG. 12, the applied voltage gradually decreases to the second voltage. The above operation can eliminate or reduce the drop in the LD current. When the MOSFET 2B is turned off, it is expected that the applied voltage will decrease due to a voltage drop caused by the resistor 2C. As the resistor 2C, which is intended to mitigate the change in the voltage, has its the resistance value set low, a rapid voltage change does not occur. In addition, if the MOSFET 2B is slowly turned off, the voltage change can be further reduced. Instead of the resistor 2C, an element having an inductance component may be used.

The period during which the MOSFET 2A is turned on and the MOSFET 2B is turned off is a short time. The first voltage is applied bypassing the resistor 20 during the period in which both the MOSFETs 2A and 2B are turned on. Thus, a situation where the heat generation of the resistor 2C is a problem does not arise. In the case where a required LD current is small and the time of current supply from the boost voltage source 7 is a short time, a situation where the heat generation of the resistor 20 is a problem does not arise. Thus, the MOSFET 2B may be omitted without being disposed.

As described above, the light-emitting element drive circuit according to the second embodiment further includes the voltage change mitigation means that mitigates the change in the applied voltage when the voltage applied to the light-emitting element is switched from the first voltage to the second voltage. The voltage change mitigation means can be provided in the second drive unit that drives the first switch element. The voltage change mitigation means operates to mitigate the change in the voltage applied to the light-emitting element when the voltage applied to the light-emitting element is switched from the first voltage to the second voltage. Consequently, the supply of current from the first DC power supply is slowly cut off, and the second DC power supply supplies current to the light-emitting element in time. As a result, it is possible to eliminate or reduce the drop in the light-emitting element current that can occur immediately after the application of the second voltage. The light-emitting element drive circuit according to the second embodiment can thus further ensure current stability at the time of constant current drive as well as achieving both a higher rate of rise of the LD current and control stability, which are the effects of the first embodiment.

In the light-emitting element drive circuit according to the second embodiment, a metal-oxide-semiconductor field-effect transistor with a planar structure can be used as the first switch element. Using a metal-oxide-semiconductor field-effect transistor with a planar structure makes it possible to easily obtain the effect of the voltage change mitigation means described above.

In the light-emitting element drive circuit according to the second embodiment, the voltage change mitigation means may be constituted by the parallel circuit made up of the third switch element and the resistor. The parallel circuit can be disposed between the first switch element and the connection point between the light-emitting element and the backflow prevention element, or between the positive terminal of the first DC power supply and the second switch element. In this configuration, the third switch element is controlled such that the third switch element is turned on at the time of application of the first voltage, and turned off at the time of switching from the first voltage to the second voltage. This control can achieve the functional effect provided by the voltage change mitigation means described above.

Third Embodiment

As described in the section of the second embodiment, the operation waveforms illustrated in FIG. 7 show the phenomenon in which the LD current drops immediately after the application of the second voltage. It is thought that the drop in the LD current is caused by the presence of the wiring inductances L3-1, L3-2, and L3-3 illustrated in FIG. 1. Not limited to the wiring inductances L3-1, L3-2, and L3-3, inductances have the property of suppressing a rapid current rise. Even when energization of the LD 10 starts with the first voltage applied, no LD current flows through the wiring inductances L3-1, L3-2, and L3-3. Immediately after switching from the first voltage to the second voltage, a counter electromotive force generated in the wiring inductances L3-1, L3-2, and L3-3 prevents the LD current from immediately following the switching, which in turn causes the drop as illustrated in the drawing. The third embodiment presents a solution to this problem different from that of the second embodiment.

Figure 13:
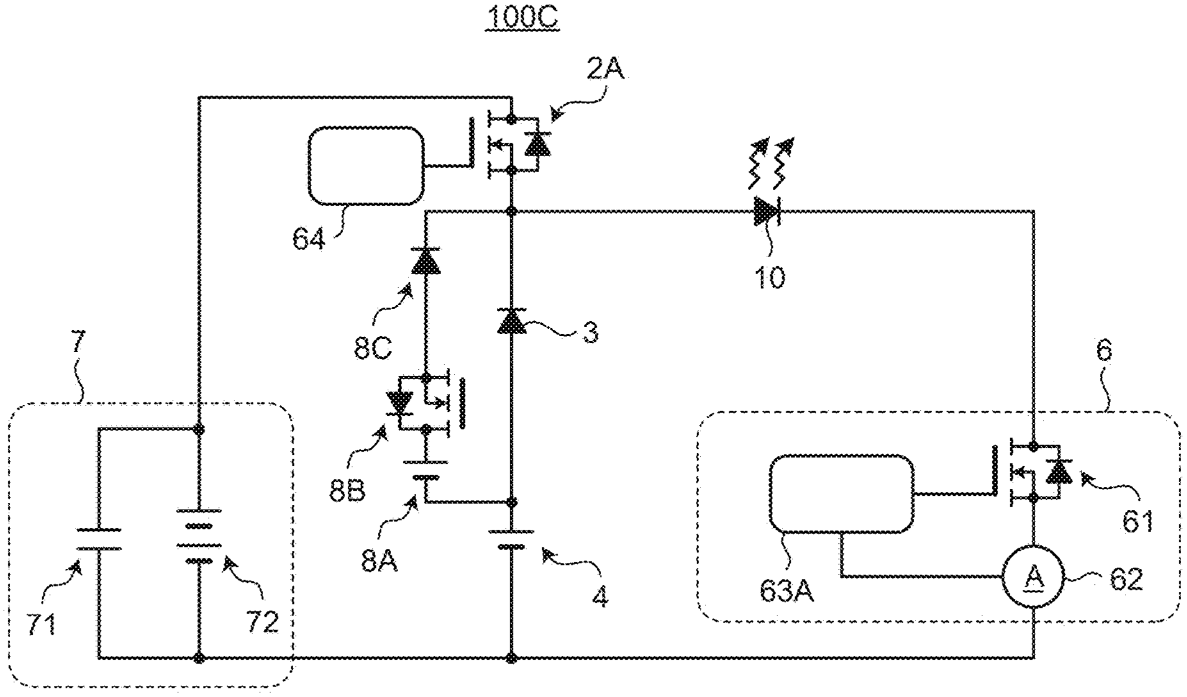
FIG. 13 is a circuit diagram illustrating a configuration of a light-emitting element drive circuit 100C according to a third embodiment.

FIG. 13 is a circuit diagram illustrating a configuration of a light-emitting element drive circuit 100C according to the third embodiment. Comparing the light-emitting element drive circuit 100C according to the third embodiment illustrated in FIG. 13 with the light-emitting element drive circuit 100 according to the first embodiment illustrated in FIG. 1 reveals that a series circuit made up of a power supply 8A as an auxiliary power supply, a MOSFET 8B, and a diode 8C is added and the entirety of this series circuit is connected in parallel with the diode 3 in FIG. 13. In the light-emitting element drive circuit 100C, the series circuit operates as a voltage adding means. Like the diode 3, the diode 8C operates as a backflow prevention element. In FIG. 13, the drive unit 64A is changed to the drive unit 64. Note that the drive unit 64 may be the drive unit 64A. The other configuration is the same as or equivalent to the configuration of FIG. 1. The same or equivalent components are denoted by the same reference numerals, and redundant descriptions thereof are omitted. In this description, the MOSFET 8B is sometimes referred to as a "fourth switch element".

In FIG. 13, the negative terminal of the power supply 8A is connected to a connection point between the positive terminal of the main voltage source 4 and the anode of the diode 3, and the positive terminal of the power supply 8A is connected to the source of the MOSFET SB. The drain of the MOSFET 8B is connected to the anode of the diode 8C. A connection point between the cathode of the diode 3 and the cathode of the diode 8C is connected to the anode of the LD 10. FIG. 13 illustrates the configuration in which the power supply 8A, the MOSFET 8B, and the diode 80 are arranged in this order from the low-potential side to the high-potential side between the anode and the cathode of the diode 3, but the present invention is not limited to this configuration. Any two of the components constituting the series circuit may be interchanged with each other, or all the three components may be interchanged with one another.

Figure 14:
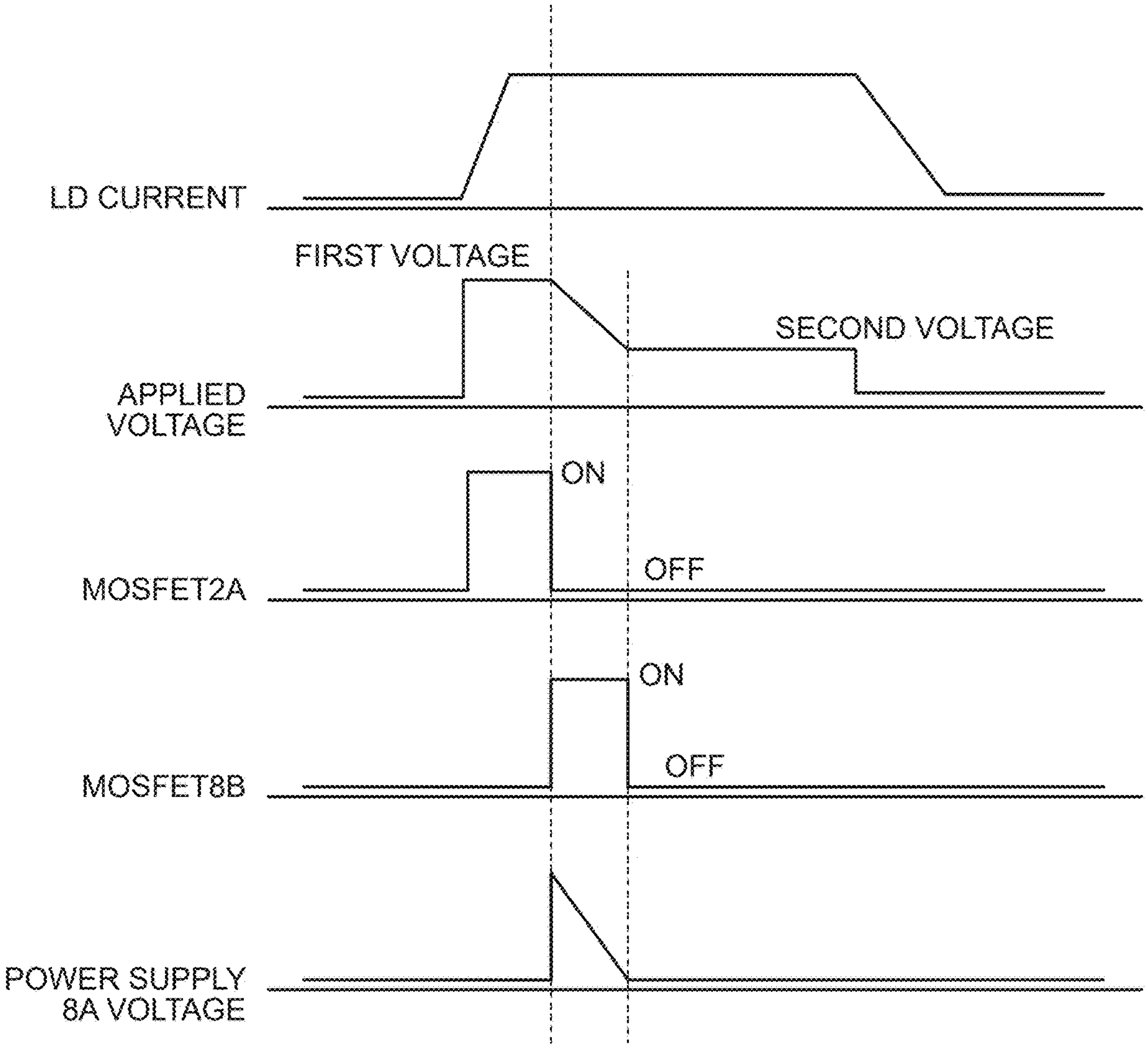
FIG. 14 is a time chart for explaining the operation of the light-emitting element drive circuit 100C according to the third embodiment.

FIG. 14 is a time chart for explaining the operation of the light-emitting element drive circuit 100C according to the third embodiment. In FIG. 14, waveforms represent, from the upper side, the LD current, the applied voltage, the operating state of the MOSFET 2A, the operating state of the MOSFET SB, and power supply 8A voltage, and the horizontal axis represents time. The power supply 8A voltage is the output voltage of the power supply 8A.

First, when the MOSFET 2A is controlled such that the MOSFET 2A is turned on, the first voltage is applied to the anode of the LD 10. Next, the MOSFET 2A is controlled such that the MOSFET 2A is turned off while the MOSFET 8B is controlled such that the MOSFET 8B is turned on. Here, the time chart illustrated in FIG. 14 illustrates operation set so as to prevent the voltage of the anode of the LD 10 from changing from the first voltage immediately after the MOSFET 8B is controlled such that the MOSFET 8B is turned on. Specifically, there is a relationship of formula (1) below among the first voltage, the second voltage, and power supply 8A open-circuit voltage.

$$(\text{Power supply } 8A \text{ open-circuit voltage}) = (\text{first voltage}) - (\text{second voltage}) \quad (1)$$

The power supply 8A open-circuit voltage is an output voltage when no load is connected to the power supply 8A. In FIG. 14, the scale of the applied voltage on the vertical axis is different from the scale of the power supply 8A voltage on the vertical axis. The power supply 8A voltage shown is vertically enlarged.

When LD current flows through the power supply 8A, this current causes the power supply 8A voltage to decrease by the sum of a voltage drop due to internal resistance (not illustrated) in the power supply 8A, a voltage drop due to the on-resistance of the MOSFET 8B, and the forward voltage drop of the diode 8C. Consequently, the LD current is slowly supplied. Thereafter, as illustrated in FIG. 14, the applied voltage gradually decreases to the second voltage. The above operation can eliminate or reduce the drop in the LD current.

The output from the power supply 8A only needs to be able to compensate only for the amount of the drop in the current as illustrated in FIG. 7. For this reason, the power supply 8A can be a low-capacity power supply. However, the power supply 8A voltage is preferably set as indicated in formula (1) above in order to reduce the change in the applied voltage immediately after the MOSFET 2A and the MOSFET 8B are controlled such that the MOSFET 2A is turned off and the MOSFET 8B is turned on. The setting as in formula (1) above allows suppression of a voltage jump immediately after switching from the first voltage to the second voltage.

Further, the power supply 8A voltage is preferably set as indicated in formula (2) below in order to reduce the change in the applied voltage immediately after the MOSFET 8B is controlled such that the MOSFET 8B is turned off. The setting as in formula (2) below allows suppression of a voltage jump at the time of completion of switching from the first voltage to the second voltage.

$$(\text{Power supply } 8A \text{ switching completion voltage}) = (\text{power supply } 8A \text{ open-circuit voltage}) - (\text{power supply } 8A \text{ internal resistance voltage drop}) - (\text{MOSFET } 8B \text{ on-resistance voltage drop}) - (\text{diode } 8C \text{ forward voltage drop}) = (\text{second voltage}) \quad (2)$$

Figure 15:
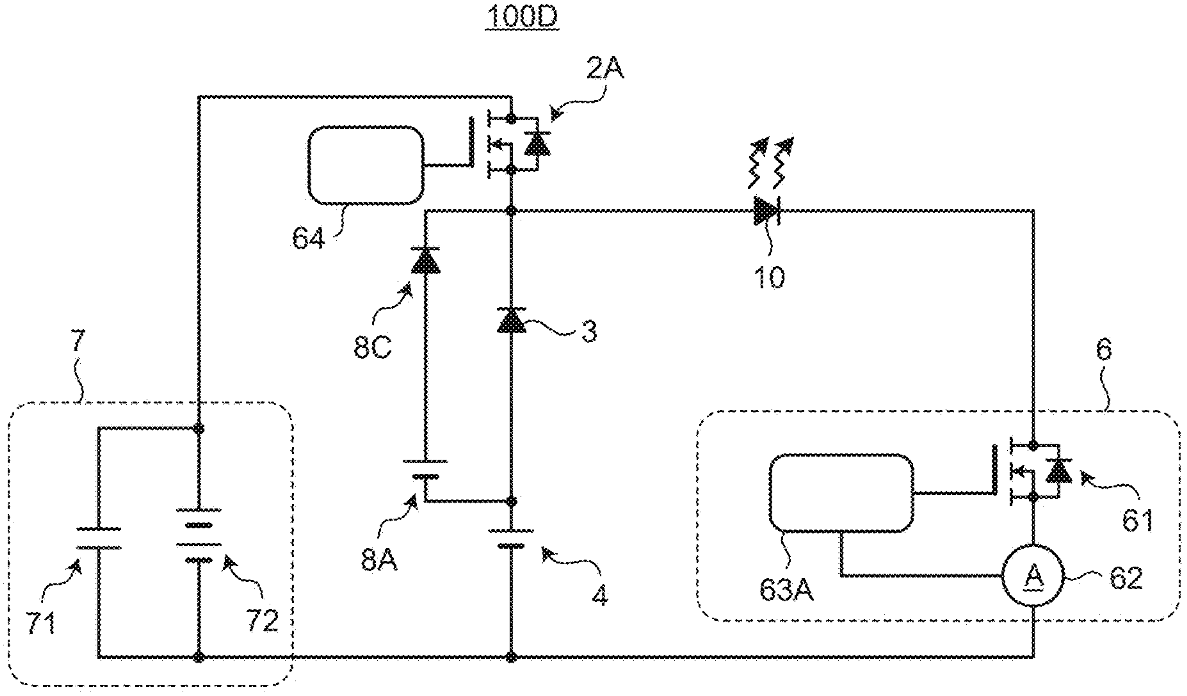
FIG. 15 is a circuit diagram illustrating a configuration of a light-emitting element drive circuit 100D according to a first modification of the third embodiment.

FIG. 15 is a circuit diagram illustrating a configuration of a light-emitting element drive circuit 100D according to a first modification of the third embodiment. In the case where the power supply 8A itself has a power-on or power-off function in the configuration of FIG. 13, the MOSFET 8B disposed between the power supply 8A and the diode 8C may be omitted as illustrated in FIG. 15.

Figure 16:
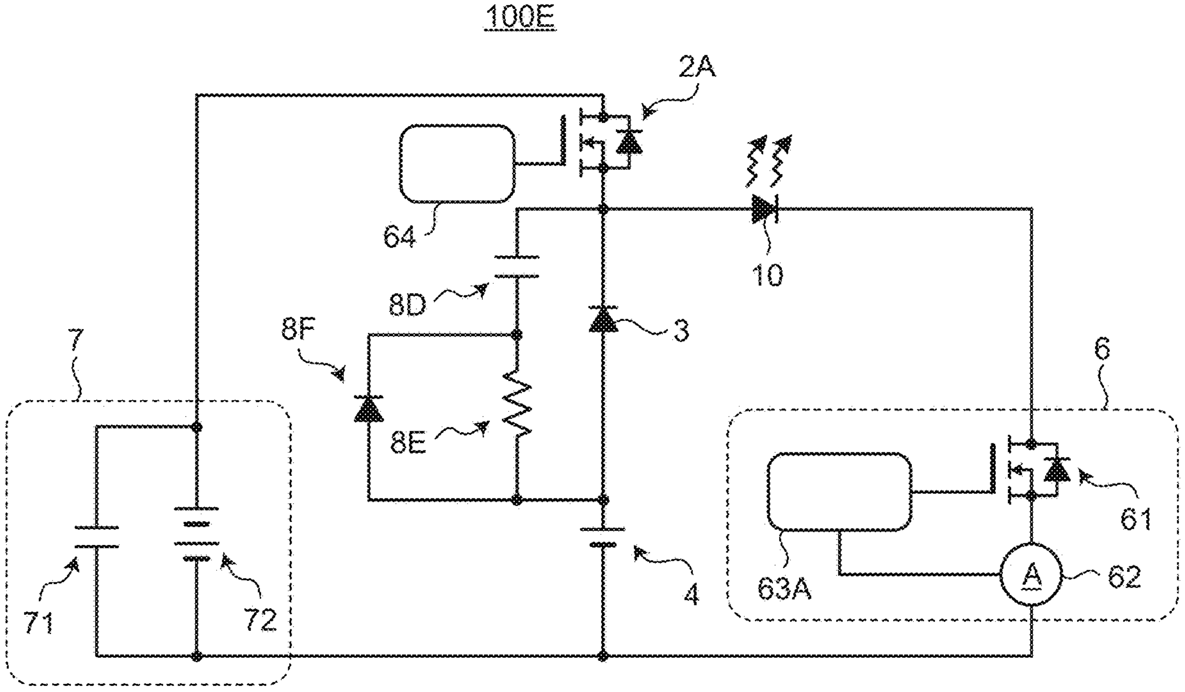
FIG. 16 is a circuit diagram illustrating a configuration of a light-emitting element drive circuit 100E according to a second modification of the third embodiment.

FIG. 16 is a circuit diagram illustrating a configuration of a light-emitting element drive circuit 100E according to a second modification of the third embodiment. Comparing the light-emitting element drive circuit 100E illustrated in FIG. 16 with the light-emitting element drive circuit 100 according to the first embodiment illustrated in FIG. 1 reveals that, in FIG. 16, a parallel-series circuit is added and the entirety of the parallel-series circuit is connected in parallel with the diode 3. The parallel-series circuit has a parallel circuit connected in series with a capacitor 8D, and the parallel circuit is made up of a resistor 8E and a diode 8F. In the light-emitting element drive circuit 100E, the parallel-series circuit operates as the voltage adding means. The capacitor 8D operates as an auxiliary power supply. In FIG. 16, the drive unit 64A is changed to the drive unit 64. Note that the drive unit 64 may be the drive unit 64A. The other configuration is the same as or equivalent to the configuration of FIG. 1. The same or equivalent components are denoted by the same reference numerals, and redundant descriptions thereof are omitted.

Figure 17:
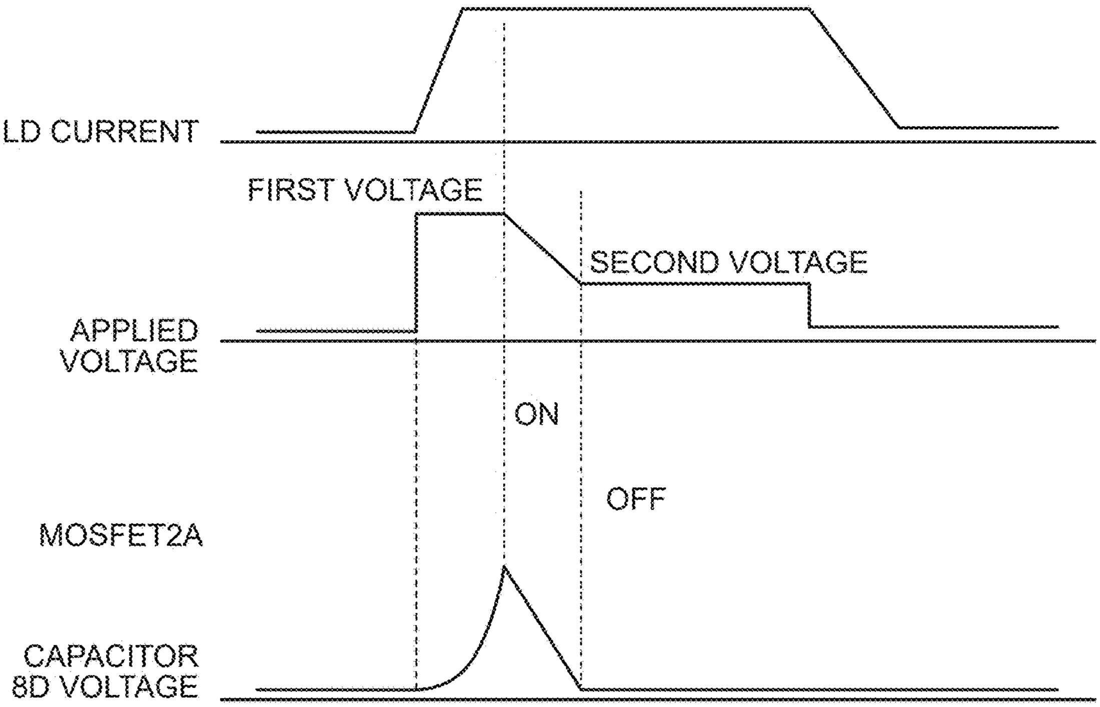
FIG. 17 is a time chart for explaining the operation of the light-emitting element drive circuit 100E according to the third embodiment.

FIG. 17 is a time chart for explaining the operation of the light-emitting element drive circuit 100E according to the third embodiment. In FIG. 17, waveforms represent, from the upper side, the LD current, the applied voltage, the operating state of the MOSFET 2A, and capacitor 8D voltage, and the horizontal axis represents time. The capacitor 8D voltage is the voltage across the capacitor 8D.

When the MOSFET 2A is controlled such that the MOSFET 2A is turned on, the first voltage is applied from the boost voltage source 7 to the LD 10. At the time of application of the first voltage, the capacitor 8D is charged by a differential voltage between the first voltage and the output voltage of the main voltage source 4. The charging current of the capacitor 8D is limited by the resistor 8E as a current-limiting resistor. This can prevent an excessive inrush current from flowing into the capacitor 8D due to the first voltage as the high voltage.

When the MOSFET 2A is controlled such that the MOSFET 2A is turned off, the capacitor 8D voltage is added to the voltage output from the main voltage source 4, which in turn is applied to the anode of the LD 10. Since the diode 8F is connected across the resistor 8E, the discharge path of the charge stored in the capacitor 8D is a path passing through the diode 8F. Consequently, power is efficiently supplied to the LD 10.

A voltage jump immediately after switching from the first voltage to the second voltage and a voltage jump at the completion of switching from the first voltage to the second voltage can be suppressed by a method similar to the method described using the time chart of FIG. 14 although the circuit operation is different therefrom. Specifically, the capacitance value of the capacitor 8D, the resistance value of the resistor 8E, the forward voltage characteristic of the diode 8F, and the like are parameters. By setting these parameters properly, the drop in the LD current can be eliminated or reduced.

As described above, the light-emitting element drive circuit according to the third embodiment further includes the voltage adding means constituted by the series circuit made up of the auxiliary power supply, the fourth switch element, and the diode, the series circuit being connected in parallel across the backflow prevention element. The voltage adding means operates to add the voltage of the auxiliary power supply to the output voltage of the second DC power supply when the voltage applied to the light-emitting element is switched from the first voltage to the second voltage. Consequently, the supply of current from the first DC power supply is slowly cut off, such that the second DC power supply supplies current to the light-emitting element in time. As a result, it is possible to eliminate or reduce the drop in the light-emitting element current that can occur immediately after the application of the second voltage. The light-emitting element drive circuit according to the third embodiment can thus further ensure current stability at the time of constant current drive as well as achieving both a higher rate of rise of the LD current and control stability, which are the effects of the first embodiment.

In the light-emitting element drive circuit according to the third embodiment, if the auxiliary power supply itself is a power supply capable of power-on or power-off operation, the fourth switch element can be omitted.

In the light-emitting element drive circuit according to the third embodiment, the voltage adding means may be constituted by the parallel-series circuit having the parallel circuit connected in series with the capacitor, the parallel circuit being made up of the resistor and the diode. In this configuration, the capacitor is charged by the differential voltage between the first voltage and the output voltage of the second DC power supply at the time of application of the first voltage, and operates as the auxiliary power supply of the voltage adding means at the time of switching from the first voltage to the second voltage. This operation can achieve the functional effect provided by the voltage adding means described above.

Fourth Embodiment

Figure 18:
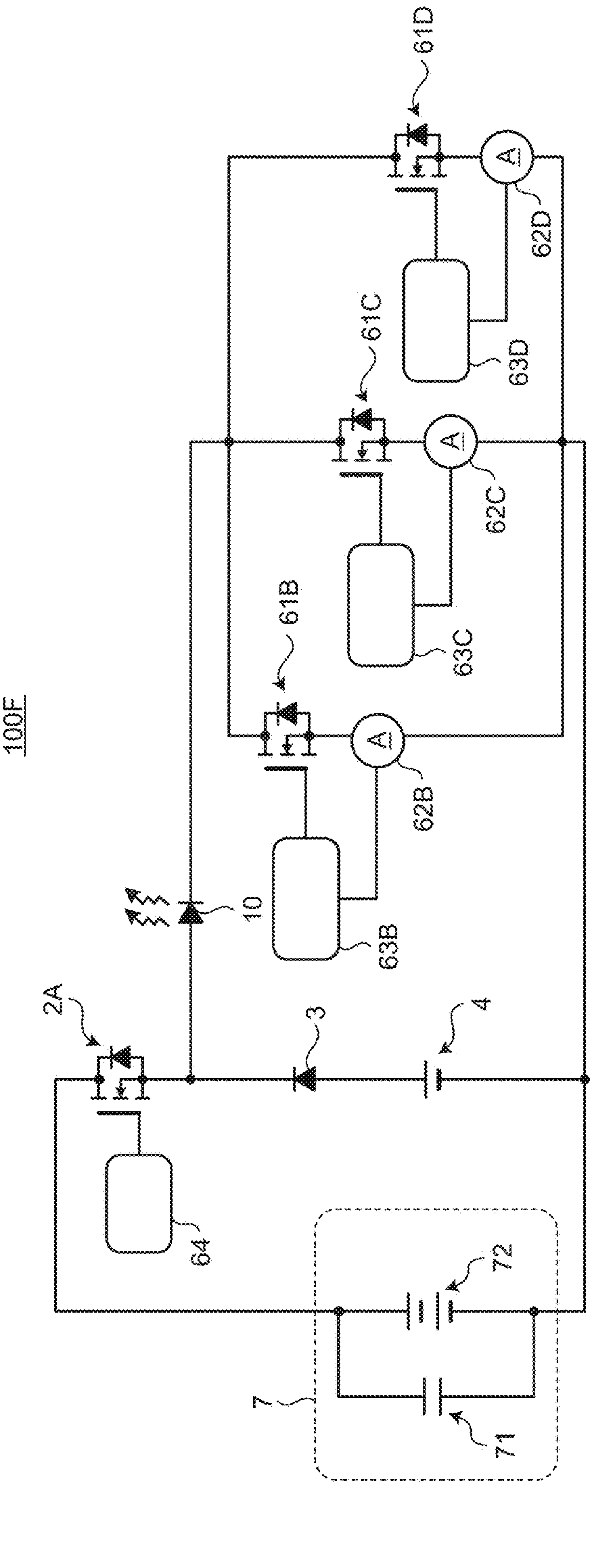
FIG. 18 is a circuit diagram illustrating a configuration of a light-emitting element drive circuit 100F according to a fourth embodiment.

FIG. 18 is a circuit diagram illustrating a configuration of a light-emitting element drive circuit 100F according to a fourth embodiment. In the light-emitting element drive circuit 100F, parts corresponding to the linear regulator 6 in FIG. 1 are arranged in parallel so as to be applied to an application in which a large current is passed. Comparing the light-emitting element drive circuit 100F according to the fourth embodiment illustrated in FIG. 18 with the light-emitting element drive circuit 100 according to the first embodiment illustrated in FIG. 1 reveals that, in FIG. 18, the single MOSFET 61 is replaced with three MOSFETs 61B, 61C, and 61D, the single current detector 62 is replaced with three current detectors 62B, 62C, and 62D, and the single drive unit 63 is replaced with three drive units 63B, 63C, and 63D. In FIG. 18, the drive unit 64A is changed to the drive unit 64. Note that the drive unit 64 may be the drive unit 64A. The other configuration is the same as or equivalent to the configuration of FIG. 1. The same or equivalent components are denoted by the same reference numerals, and redundant descriptions thereof are omitted.

For diode loads such LDs or LEDs, the magnitudes of forward voltage drops vary depending on current flowing through the diode loads. Thus, in the configuration of FIG. 18, the second voltage to be applied to the MOSFETs 61B, 61C, and 61D needs to be adjusted in order to optimize the operation of the MOSFETs 61B, 61C, and 61D connected in series with the LD 10. Accordingly, the constant circuit 1 or 2 illustrated in FIG. 3 also needs to be a constant circuit adapted to the adjusted second voltage.

Figure 19:
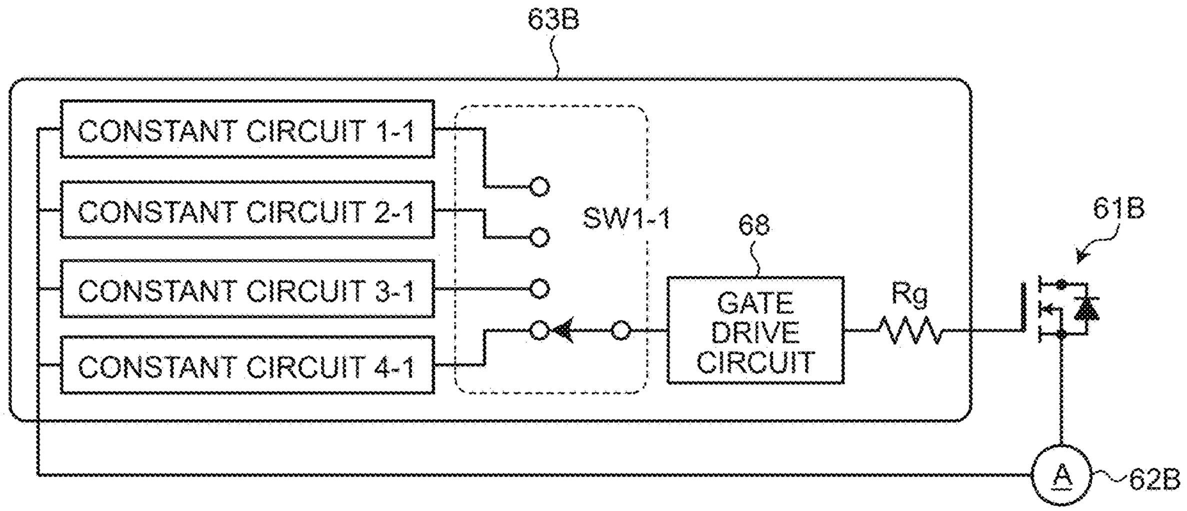
FIG. 19 is a circuit diagram illustrating an exemplary configuration of a drive unit 63B illustrated in FIG. 18.
Figure 20:
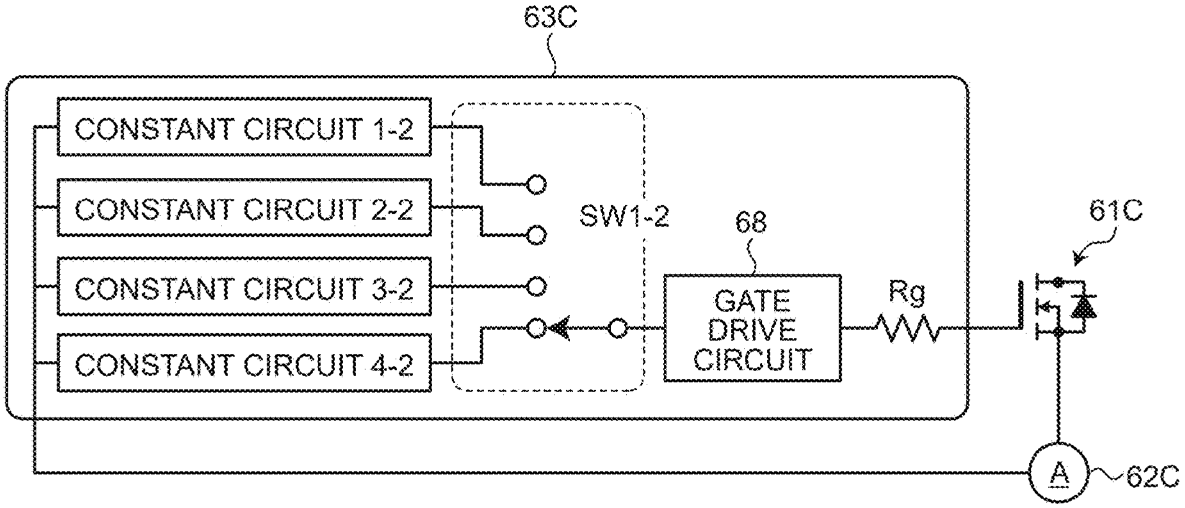
FIG. 20 is a circuit diagram illustrating an exemplary configuration of a drive unit 63C illustrated in FIG. 18.
Figure 21:
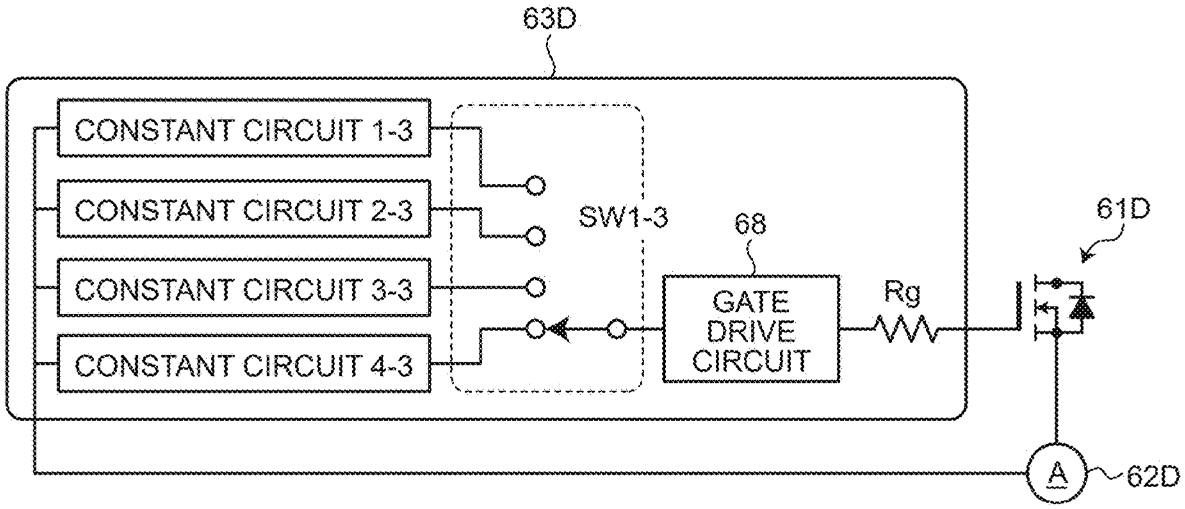
FIG. 21 is a circuit diagram illustrating an exemplary configuration of a drive unit 63D illustrated in FIG. 18.

FIG. 19 is a circuit diagram illustrating an exemplary configuration of the drive unit 63B illustrated in FIG. 18. FIG. 20 is a circuit diagram illustrating an exemplary configuration of the drive unit 63C illustrated in FIG. 18. FIG. 21 is a circuit diagram illustrating an exemplary configuration of the drive unit 63D illustrated in FIG. 18.

The description of the first embodiment has been made as to switching between the two constant circuits to achieve both a higher rate of rise of the LD current and control stability. If the LD current varies greatly, a preferred embodiment includes constant circuits accordingly. FIGS. 19 to 21 are an example in which the LD current is divided into two categories, a large current and a small current, and each drive unit switches between four constant circuits accordingly.

Specifically, in the drive unit 63B illustrated in FIG. 19, four constant circuits 1-1, 2-1, 3-1, and 4-1 are switched by a switch mechanism SW1-1. In the drive unit 63C illustrated in FIG. 20, four constant circuits 1-2, 2-2, 3-2, and 4-2 are switched by a switch mechanism SW1-2. In the drive unit 63D illustrated in FIG. 21, four constant circuits 1-3, 2-3, 3-3, and 4-3 are switched by a switch mechanism SW1-3.

Figure 22:
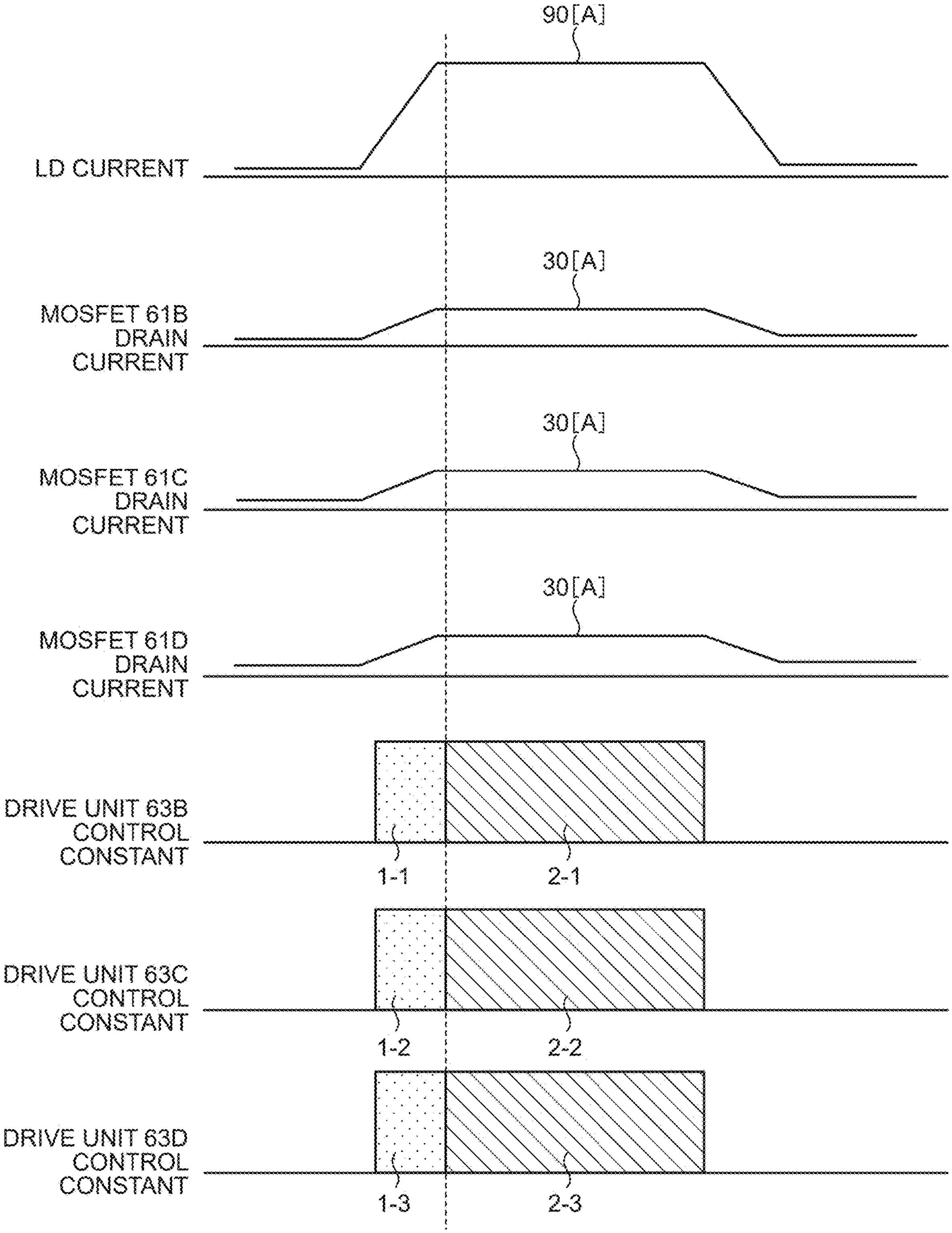
FIG. 22 is a first time chart for explaining operation in the case where control is performed using the drive units 63B, 63C, and 63D of FIG. 18.

FIG. 22 is a first time chart for explaining operation in the case where control is performed using the drive units 63B, 63C, and 63D of FIG. 18. In FIG. 22, waveforms of drain currents flowing through the MOSFETS 61B, 61C, and 61D are illustrated on the upper side, and control constants set in the drive units 63B, 63C, and 63D are illustrated on the lower side. The horizontal axis represents time.

In the example of FIG. 22, 90 [A] passes through the LD 10, and the three MOSFETs 61B, 61C, and 61D equally bear the current of 90 [A]. An example of the large current is 90 [A]. The maximum current that can pass through the individual MOSFETs 61B, 61C, and 61D is 30 [A].

As illustrated in FIG. 22, when the drain current reaches set 30 [A], the drive unit 63B switches the constant circuit from the constant circuit 1-1 to the constant circuit 2-1. Likewise, when the drain current reaches 30 [A], the drive unit 63C switches the constant circuit from the constant circuit 1-2 to the constant circuit 2-2. When the drain current reaches 30 [A], the drive unit 63D switches the constant circuit from the constant circuit 1-3 to the constant circuit 2-3. These operations can stably drive the LD 10 without oscillating the LD current.

Figure 23:
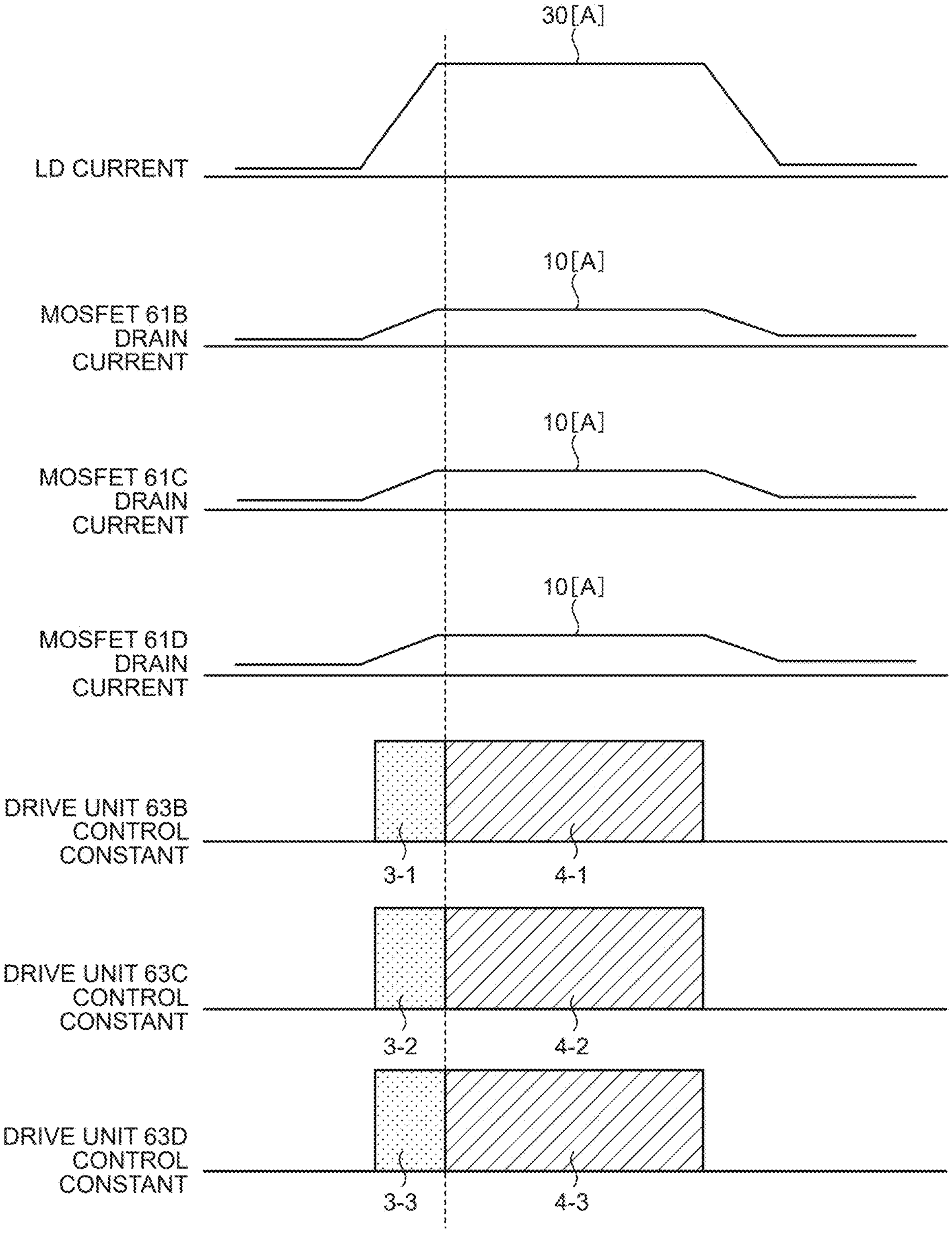
FIG. 23 is a second time chart for explaining operation in the case where control is performed using the drive units 63B, 63C, and 63D of FIG. 18.

FIG. 23 is a second time chart for explaining operation in the case where control is performed using the drive units 63B, 63C, and 63D of FIG. 18. The types of waveforms and how they are represented are the same as those in FIG. 22.

In the example of FIG. 23, 30 [A] passes through the LD 10, and the three MOSFETs 61B, 61C, and 61D equally bear the current of 30 [A]. Another example of the large current is 30 [A].

As illustrated in FIG. 23, when the drain current reaches set 10 [A], the drive unit 63B switches the constant circuit from the constant circuit 3-1 to the constant circuit 4-1. Likewise, when the drain current reaches 10 [A], the drive unit 63C switches the constant circuit from the constant circuit 3-2 to the constant circuit 4-2. When the drain current reaches 10 [A], the drive unit 63D switches the constant circuit from the constant circuit 3-3 to the constant circuit 4-3. These operations can stably drive the LD 10 without oscillating the LD current.

Figure 24:
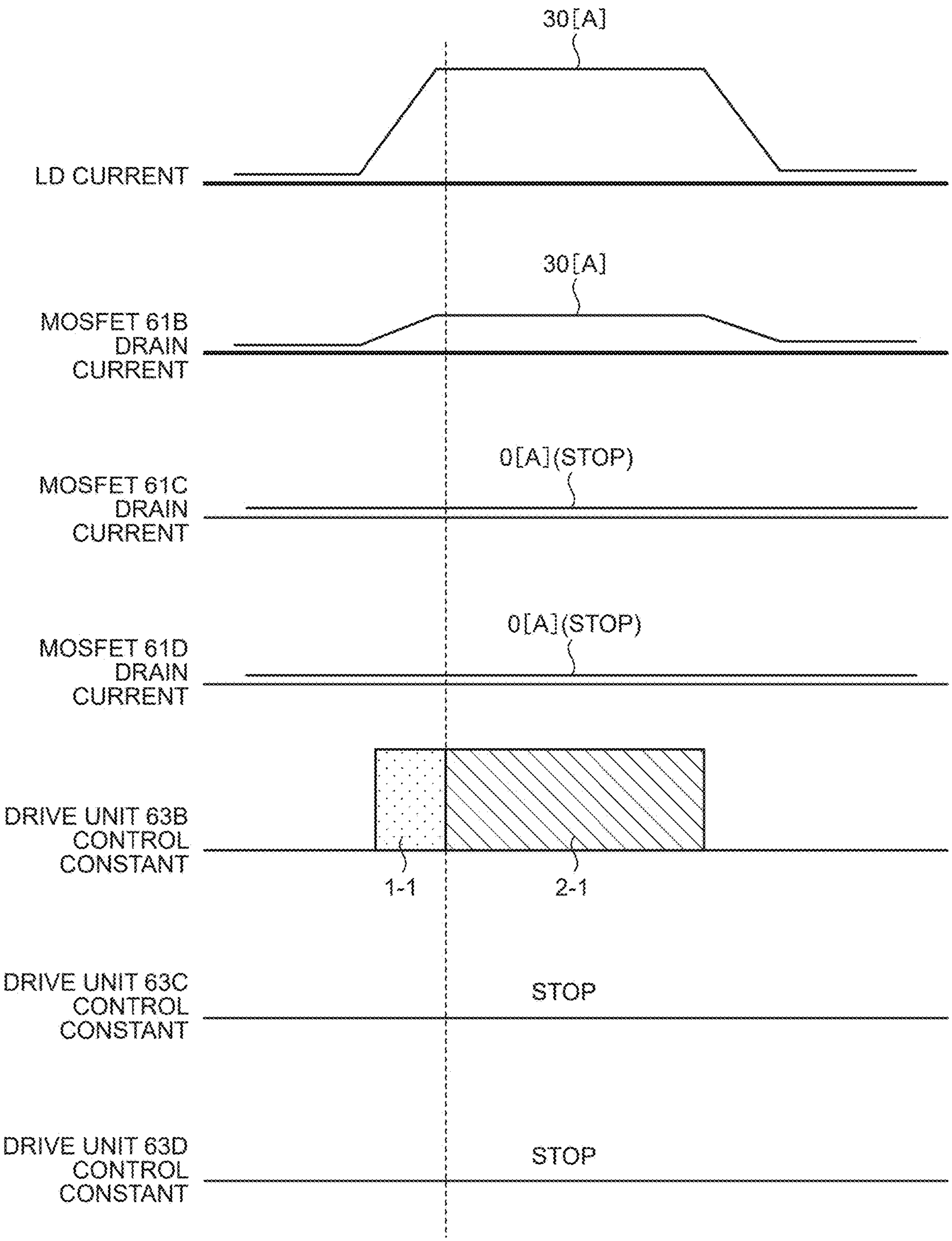
FIG. 24 is a time chart for explaining operation in the case where current is passed through an LD 10 using only a MOSFET 61B of FIG. 18.

When 30 [A] passes through the LD 10, it is possible to operate only one of the MOSFETs instead of operating all the MOSFETs. FIG. 24 is a time chart for explaining operation in the case where current passes through the LD 10 using only the MOSFET 61B of FIG. 18. The types of and how to represent waveforms are represented are the same as those in FIG. 22. In the case where current passes only through the MOSFET 61B as illustrated in FIG. 24, the drive units 63C and 63D stop operating. When the drain current reaches 30 [A], the drive unit 63B switches the constant circuit from the constant circuit 1-1 to the constant circuit 2-1. As a result, the LD current does not oscillate, and the LD 10 is stably driven.

Figure 25:
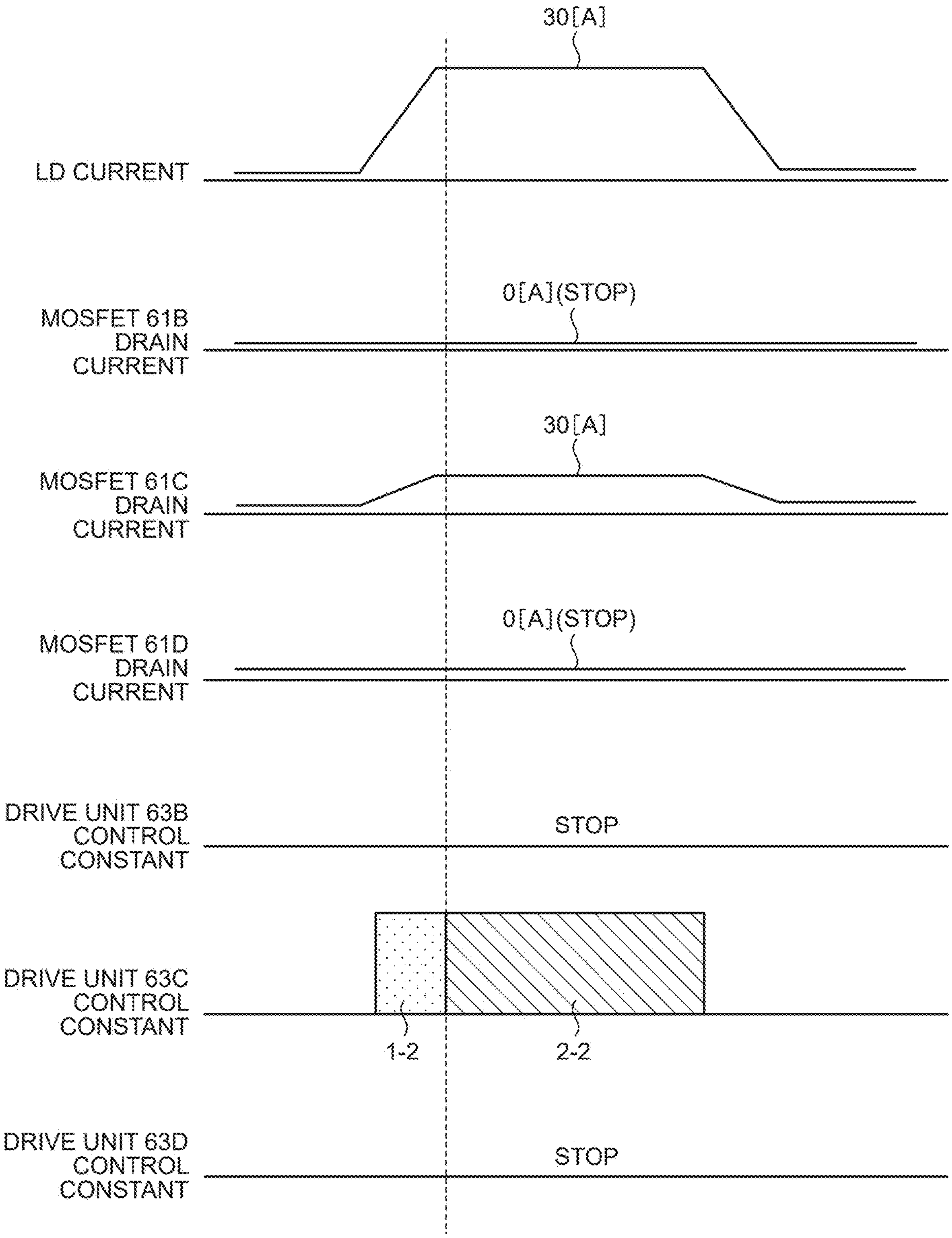
FIG. 25 is a time chart for explaining operation in the case where current is passed through the LD 10 using only a MOSFET 61C of FIG. 18.

FIG. 25 is a time chart for explaining operation in the case where current passes through the LD 10 using only the MOSFET 61C of FIG. 18. The types of and how to represent waveforms are the same as those in FIG. 22. In the case where current passes only through the MOSFET 61C as illustrated in FIG. 25, the drive units 63B and 63D stop operating. When the drain current reaches 30 [A], the drive unit 63C switches the constant circuit from the constant circuit 1-2 to the constant circuit 2-2. As a result, the LD current does not oscillate, and the LD 10 is stably driven.

Figure 26:
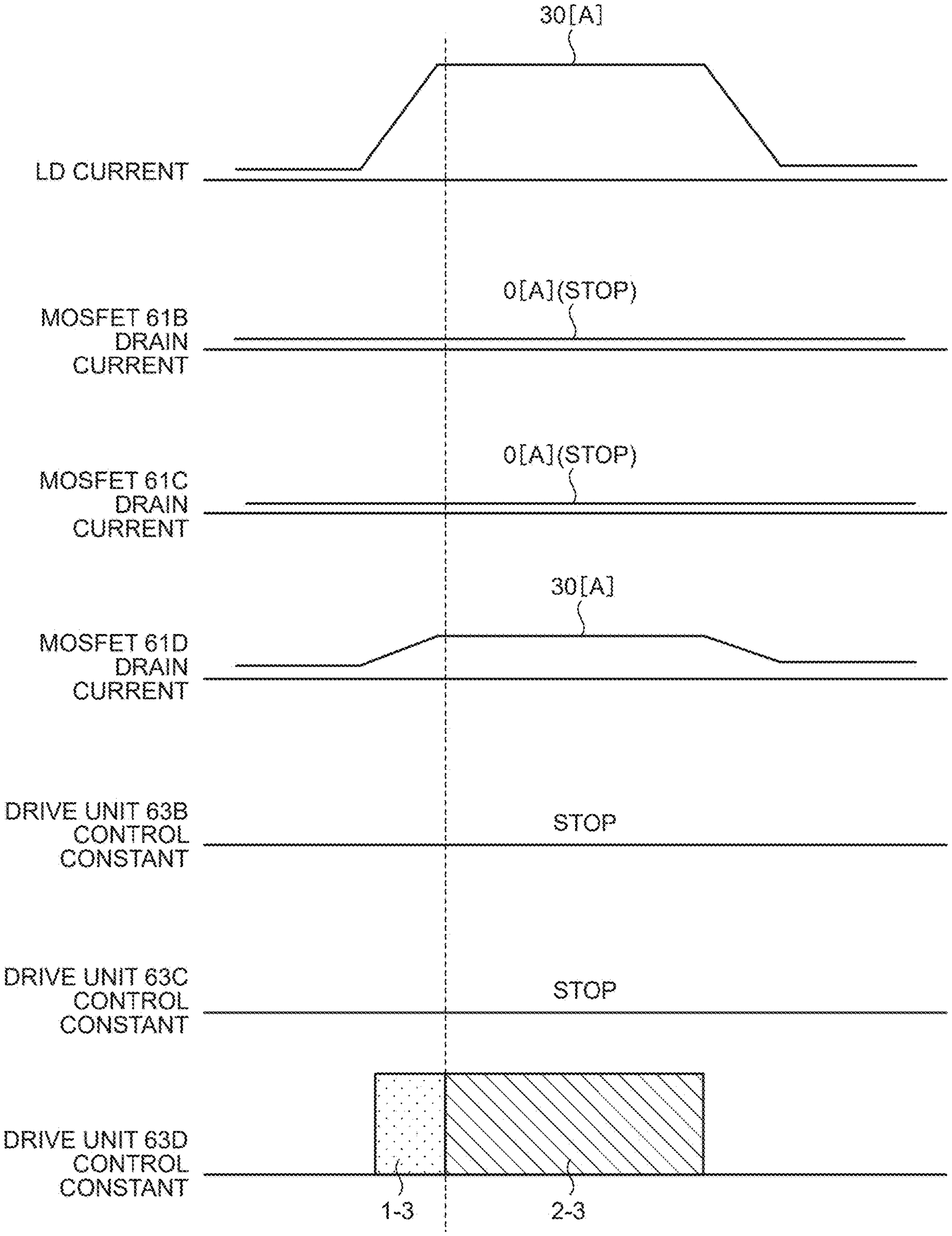
FIG. 26 is a time chart for explaining operation in the case where current is passed through the LD 10 using only a MOSFET 61D of FIG. 18.

FIG. 26 is a time chart for explaining operation in the case where current passes through the LD 10 using only the MOSFET 61D of FIG. 18. The types of and how to represent waveforms are the same as those in FIG. 22. In the case where current passes only through the MOSFET 61D as illustrated in FIG. 26, the drive units 63B and 63C stop operating. When the drain current reaches 30 [A], the drive unit 63D switches the constant circuit from the constant circuit 1-3 to the constant circuit 2-3. As a result, the LD current does not oscillate, and the LD 10 is stably driven.

Figure 27:
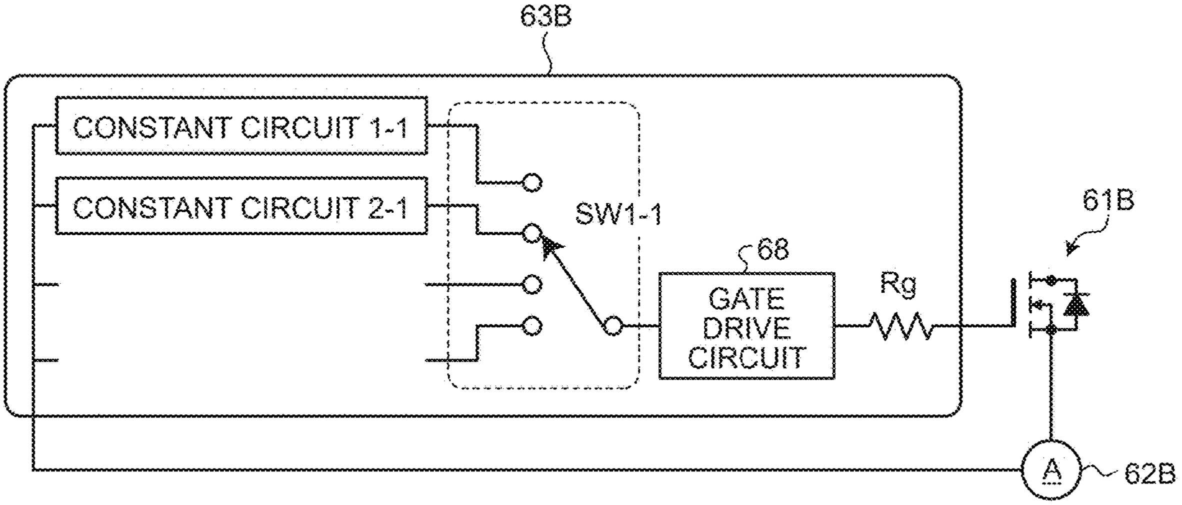
FIG. 27 is a circuit diagram illustrating another exemplary configuration of the drive unit 63B illustrated in FIG. 18.
Figure 28:
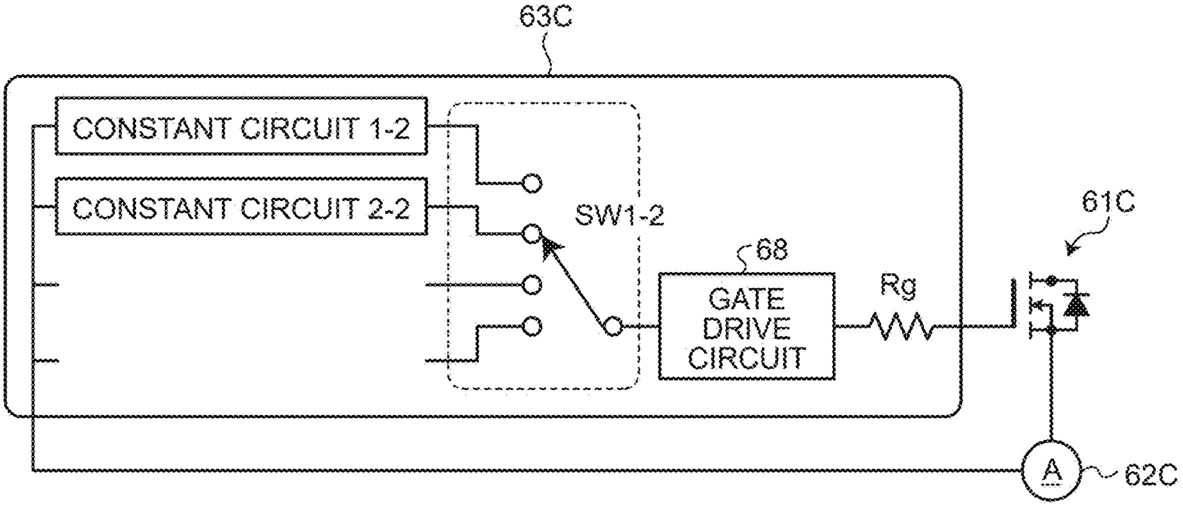
FIG. 28 is a circuit diagram illustrating another exemplary configuration of the drive unit 63C illustrated in FIG. 18.
Figure 29:
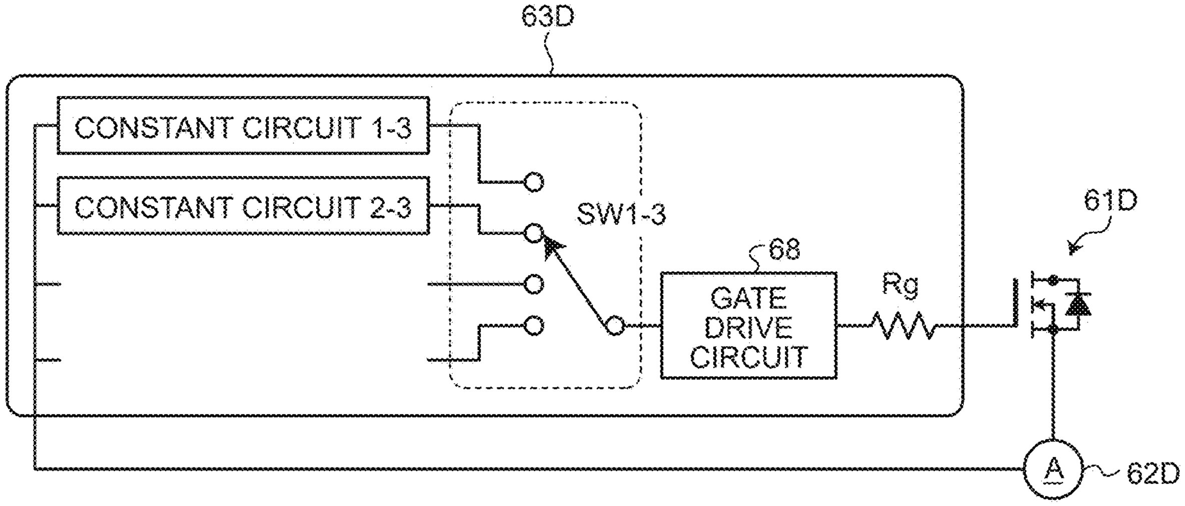
FIG. 29 is a circuit diagram illustrating another exemplary configuration of the drive unit 63D illustrated in FIG. 18.

Comparing the case where the light-emitting element drive circuit 100F according to the fourth embodiment is operated as in FIGS. 22 and 23 with the case where the light-emitting element drive circuit 100F is operated as in FIGS. 24 to 26 reveals that the latter is advantageous over the former. In the case where the light-emitting element drive circuit 100F is operated as in the former, each drive unit requires four constant circuits as illustrated in FIGS. 19 to 21. By contrast, in the case where the light-emitting element drive circuit 100F is operated as in the latter, each drive unit only needs to include two constant circuits. A specific exemplary configuration is illustrated in FIGS. 27 to 29. FIG. 27 is a circuit diagram illustrating another exemplary configuration of the drive unit 63B illustrated in FIG. 18. FIG. 28 is a circuit diagram illustrating another exemplary configuration of the drive unit 63C illustrated in FIG. 18. FIG. 29 is a circuit diagram illustrating another exemplary configuration of the drive unit 63D illustrated in FIG. 18. In FIG. 27, the constant circuits 3-1 and 4-1 illustrated in FIG. 19 can be omitted. In FIG. 28, the constant circuits 3-2 and 4-2 illustrated in FIG. 20 can be omitted. In FIG. 29, the constant circuits 3-3 and 4-3 illustrated in FIG. 21 can be omitted. Thus, in the latter case, effects such as a reduction in the circuit area can be obtained.

In order to allow the operation of only one of the MOSFETs, an idea to equalize burdens is required. For this purpose, it is required that the MOSFET to be energized be changed regularly or irregularly, for example, to thereby equalize the frequency of use of the MOSFETs. An example of equalizing the use frequencies of the MOSFETs can be to provide a timer function to count the drive time of each MOSFET or to provide a function to count the cumulative amount of current that has flowed through each MOSFET.

The above example is where equal currents pass through the three MOSFETs 61B, 61C, and 61D, but the present invention is not limited to this example. For example, consider a case where the maximum current that can pass through the MOSFET 61B is 10 [A], the maximum current that can pass through the MOSFET 61C is 20 [A], and the maximum current that can pass through the MOSFET 61D is 40 [A]. In this case, it is possible to carry a current of 10 to 70 [A] through the LD 10 in increments of 10 [A]. In the case where the current differs by 10 [A], there may arise the necessity to include a constant circuit corresponding to that current and switch the constant circuit at the time of switching of the applied voltage, which may depend on the load characteristics of the LD 10. In this case, 7×2=14 constant circuits are required to handle seven currents of 10 to 70 [A]. In contrast to this, by using the parallel drive configuration as illustrated in FIG. 18, the number of the MOSFETs×2, that is, 3×2=6 constant circuits can achieve that.

As described above, the light-emitting element drive circuit according to the fourth embodiment is the light-emitting element drive circuit according to the first to third embodiments with two or more linear regulators, the two or more linear regulators having the second switch elements connected in parallel with each other. Only one of the two or more second switch elements is driven at one time, and the second switch element to be driven is regularly or irregularly changed. This can equalize use frequency among the two or more second switch elements.

In the above configuration, the two or more second switch elements may be configured such that two or more of them are driven at one time. When two or more of them are driven at one time, the second switch elements are driven such that mutually different currents flow therethrough. Driving in this way can prevent a proportional increase in the number of constant circuits even when the drive current value is set in small increments. This can prevent an increase in the circuit area even when the number of set values of the drive current is increased.

Fifth Embodiment

Figure 30:
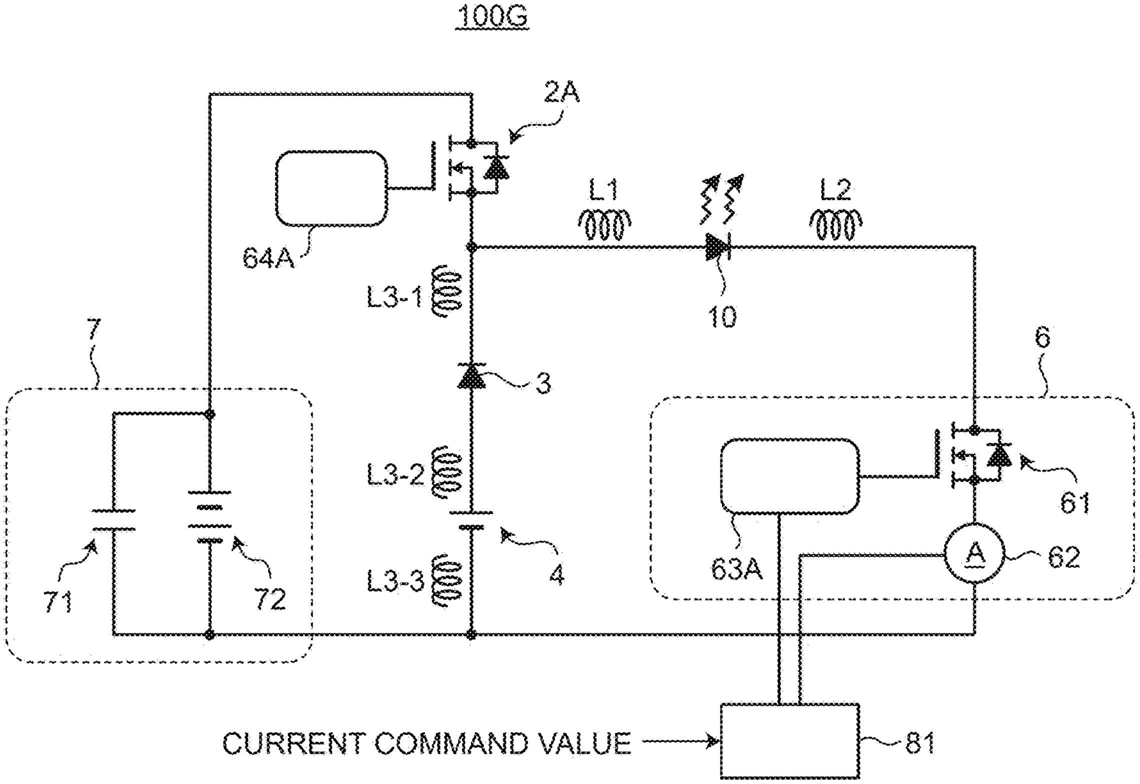
FIG. 30 is a circuit diagram illustrating a configuration of a light-emitting element drive circuit 100G according to a fifth embodiment.

A fifth embodiment describes a more specific circuit configuration for implementing the control in the first to fourth embodiments described above in driving the light-emitting element. FIG. 30 is a circuit diagram illustrating a configuration of a light-emitting element drive circuit 100G according to the fifth embodiment. In FIG. 30, a control unit 81 is added to the configuration of the light-emitting element drive circuit 100 illustrated in FIG. 1. The other configuration is the same as or equivalent to that of the light-emitting element drive circuit 100 illustrated in FIG. 1. The same or equivalent components are denoted by the same reference numerals, and redundant descriptions thereof are omitted.

The control unit 81 generates control signals for controlling the drive unit 63A, on the basis of an external current command value and a detection value of the current detector 62, and outputs the control signals to the drive unit 63A. The drive unit 63A controls the conduction of the MOSFET 61, on the basis of the control signals output from the control unit 81.

Figure 31:
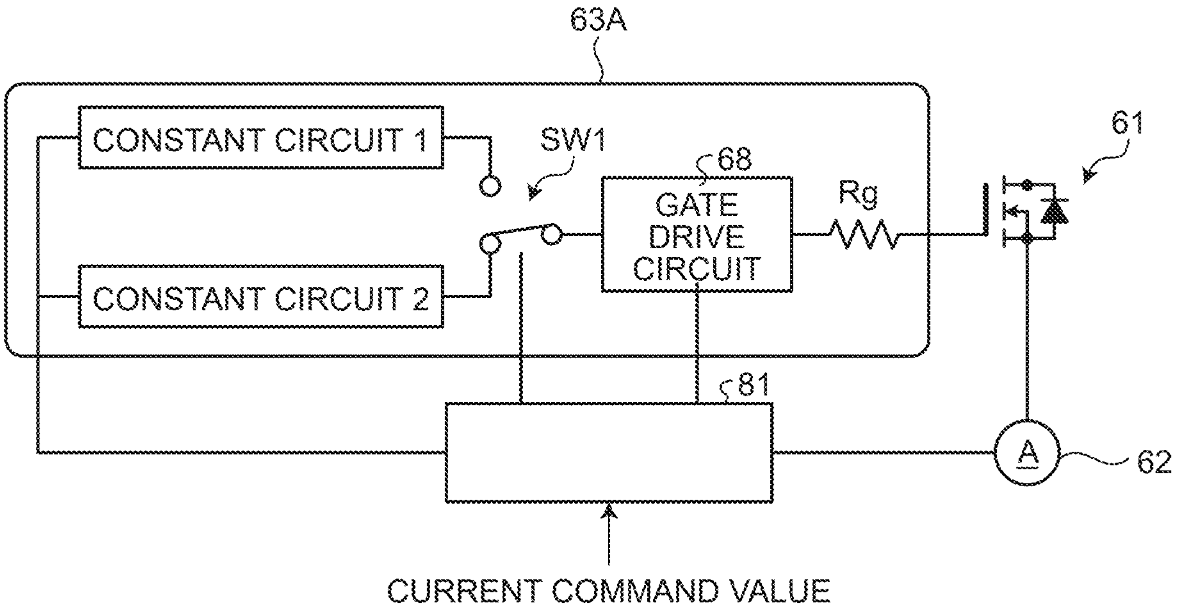
FIG. 31 is a circuit diagram illustrating a connection relationship between a control unit 81 and the drive unit 63A according to the fifth embodiment.

Specific signals will be described. FIG. 31 is a circuit diagram illustrating a connection relationship between the control unit 81 and the drive unit 63A according to the fifth embodiment. In FIG. 31, the MOSFET 61 and the current detector 62 are illustrated together with the control unit 81 and the drive unit 63A illustrated in FIG. 6.

The control unit 81 generates control signals for controlling the drive unit 63A, on the basis of an external current command value and a detection value of the current detector 62. Specifically, the control unit 81 generates a control signal directed to the switch mechanism SW1 that switches between the constant circuit 1 and the constant circuit 2, and a control signal directed to the gate drive circuit 68 for controlling the MOSFET 61. The control unit 81 outputs a current detection value detected by the current detector 62 to the constant circuits 1 and 2. The current detection value may be directly transmitted from the current detector 62 to the constant circuits 1 and 2 without passing through the control unit 81. In the configuration where the current detection value is transmitted to the constant circuits 1 and 2 through the control unit 81, the control unit 81 can perform noise removal, signal level shifting, amplification, and the like thereon. This configuration therefore makes it possible to prevent overvoltage on the constant circuits 1 and 2 and the downstream gate drive circuit 68, and also to improve the accuracy of control on the drive unit 63A. Furthermore, in this configuration, when the detection value of the current detection value is an overcurrent, a signal to that effect can be sent to the gate drive circuit 68 to thereby turn off the MOSFET 61, so that the flow of the overcurrent through the LD 10 can be prevented.

The operation of the control unit 81 will be described with reference to FIG. 7. In a period of the first voltage, the control unit 81 controls the switch mechanism SW1 so as to enable the use of the constant circuit 1, and controls the MOSFET 61 such that the MOSFET 61 is turned on. When the current flowing through the LD 10 reaches a target value, the control unit 81 controls the switch mechanism SW1 so as to enable the use of the constant circuit 2 to thereby switch to the second voltage. This can minimize the drop in the LD current. Switching to the constant circuit 2 does not need to be performed immediately after the current flowing through the LD 10 reaches the target value, and may be performed after a certain period has elapsed since the current flowing through the LD 10 reached the target value. The target value of the current is externally input as a current command value.

The fifth embodiment has described an example in which the configuration including the control unit 81 is applied to the light-emitting element drive circuit 100 illustrated in FIG. 1, but the present invention is not limited to this example. The control unit 81 can be applied to each of the light-emitting element drive circuits 100A, 100B, 100C, 100D, 100E, and 100F.

The hardware configuration of the control unit 81 can include processing circuitry and an interface for inputting and outputting signals. The processing circuitry corresponds to a single circuit, a combined circuit, an application-specific integrated circuit (ASIC), a field-programmable gate array (FPGA), or a combination of them, including a noise filter circuit and a signal amplifier circuit. Information to be input to the processing circuitry and information to be output from the processing circuitry can be obtained through the interface. In the case where more advanced arithmetic processing is performed to implement the function of the control unit 81 according to the present disclosure, a processor that performs arithmetic and a memory that stores a program to be read by the processor may be included instead of the processing circuitry.

The configurations described in the above embodiments illustrate an example, and can be combined with another known art. The embodiments can be combined with each other. The configurations can be partly omitted or changed without departing from the gist.

REFERENCE SIGNS LIST

1, 1-1, 1-2, 1-3, 2, 2-1, 2-2, 2-3, 3-1, 3-2, 3-3, 4-1, 4-2, 4-3 constant circuit; 2A, 2B, 3A, 8B, 61, 61B, 61C, 61D MOSFET; 2C, 8E resistor; 3, 8C, 8F, D1, D2 diode; 4 main voltage source; 6 linear regulator; 7 boost voltage source; 8A power supply; 8D, 71 capacitor; 10 LD; 62, 62B, 62C, 62D current detector; 63A, 63B, 63C, 63D drive unit; 64, 64A second drive unit; 68, 69 gate drive circuit; 72 voltage source; 81 control unit; 100, 100A, 100B, 100C, 100D, 100E, 100F, 100G light-emitting element drive circuit; L1, L2, L3-1, L3-2, L3-3 wiring inductance; Rg, Rg1, Rgoff, Rgon gate resistor; SW1, SW1-1, SW1-2, SW1-3 switch mechanism.

The invention claimed is:

1. A light-emitting element drive circuit to drive a light-emitting element, comprising:

a first DC power supply to hold a first voltage, the first DC power supply being connected to an anode of the light-emitting element so as to be able to apply the first voltage to the anode of the light-emitting element;

a second DC power supply connected to the anode of the light-emitting element so as to be able to apply a second voltage lower than the first voltage to the anode of the light-emitting element;

a first switch element to switch on and off application of the first voltage to the anode of the light-emitting element; and a linear regulator to control current flowing through the light-emitting element, the linear regulator including a second switch element through which the current flowing through the light-emitting element flows, and a drive unit to drive the second switch element, the drive unit including a gate drive circuit to drive a gate of the second switch element, and two or more constant circuits having mutually different control constants set, the drive unit selects one of the two or more constant circuits and connect the selected one to the gate drive circuit, according to whether a voltage applied to the light-emitting element is the first voltage or the second voltage.

2. The light-emitting element drive circuit according to claim 1, further comprising a voltage change mitigator to mitigate a change in the voltage applied to the light-emitting element when the voltage applied is switched from the first voltage to the second voltage.

3. The light-emitting element drive circuit according to claim 2, comprising a second driver to drive the first switch element, wherein the voltage change mitigator is provided in the second driver.

4. The light-emitting element drive circuit according to claim 3, wherein the first switch element is a metal-oxide-semiconductor field-effect transistor with a planar structure.

5. The light-emitting element drive circuit according to claim 2, further comprising a backflow prevention element connected in an orientation that prevents the first voltage from being applied to the second DC power supply, and wherein the voltage change mitigator includes a parallel circuit made up of a third switch element and a resistor, and the parallel circuit is disposed between the second switch element and a connection point between the light-emitting element and the backflow prevention element or between a positive terminal of the first DC power supply and the second switch element.

6. The light-emitting element drive circuit according to claim 5, wherein the third switch element is controlled such that the third switch element is turned on at a time of application of the first voltage, and turned off at a time of switching from the first voltage to the second voltage.

7. The light-emitting element drive circuit according to claim 1, further comprising a voltage adder including an auxiliary power supply, the voltage adder being to add a voltage of the auxiliary power supply to an output voltage of the second DC power supply when the voltage applied to the light-emitting element is switched from the first voltage to the second voltage.

8. The light-emitting element drive circuit according to claim 7, further comprising a backflow prevention element connected in an orientation that prevents the first voltage from being applied to the second DC power supply, and wherein the voltage adder includes a series circuit made up of the auxiliary power supply, a fourth switch element, and a diode, and the series circuit is connected in parallel across the backflow prevention element.

9. The light-emitting element drive circuit according to claim 7, further comprising a backflow prevention element connected in an orientation that prevents the first voltage from being applied to the second DC power supply, and wherein the voltage adder includes a series circuit made up of the auxiliary power supply and a diode, the auxiliary power supply is a power supply capable of power-on or power-off operation, and the series circuit is connected in parallel across the backflow prevention element.

10. The light-emitting element drive circuit according to claim 7, further comprising a backflow prevention element connected in an orientation that prevents the first voltage from being applied to the second DC power supply, and wherein the voltage adder includes a parallel-series circuit having a parallel circuit connected in series with a capacitor, the parallel circuit being made up of a resistor and a diode, and the parallel-series circuit is connected in parallel across the backflow prevention element.

11. The light-emitting element drive circuit according to claim 10, wherein the capacitor is charged by a differential voltage between the first voltage and the output voltage of the second DC power supply at a time of application of the first voltage, and the capacitor operates as the auxiliary power supply of the voltage adder at a time of switching from the first voltage to the second voltage.

12. The light-emitting element drive circuit according to claim 1, wherein the number of the linear regulators is two or more, and the second switch elements in the two or more linear regulators are connected in parallel with each other.

13. The light-emitting element drive circuit according to claim 12, wherein only one of the two or more second switch elements is driven at one time, and the second switch element to be driven is regularly or irregularly changed.

14. The light-emitting element drive circuit according to claim 12, wherein one or more of the two or more second switch elements are driven at one time, and when the two or more second switch elements are driven at one time, mutually different currents flow through the driven second switch elements.

15. The light-emitting element drive circuit according to claim 1, further comprising a current detector to detect the current flowing through the light-emitting element.

16. The light-emitting element drive circuit according to claim 15, comprising control circuitry to generate a control signal for controlling the drive unit, on a basis of an external current command value and a detection value of the current detector.

17. A laser processing machine comprising:

the light-emitting element; and the light-emitting element drive circuit according to claim 1 to drive the light-emitting element.

* * * * *